US007524557B2

(12) United States Patent
Okamoto et al.

(10) Patent No.: US 7,524,557 B2
(45) Date of Patent: Apr. 28, 2009

(54) HIGHLY HEAT CONDUCTIVE INSULATING MEMBER, METHOD OF MANUFACTURING THE SAME AND ELECTROMAGNETIC DEVICE

(75) Inventors: Tetsushi Okamoto, Tokyo (JP); Hiroyoshi Tsuchiya, Tokyo (JP); Fumio Sawa, Tokyo (JP); Noriyuki Iwata, Tokyo (JP); Mitsuhiko Koyama, Tokyo (JP); Yukio Suzuki, Tokyo (JP); Akihiko Suzuki, Tokyo (JP); Tooru Ootaka, Tokyo (JP); Shigehito Ishii, Tokyo (JP); Susumu Nagano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 297 days.

(21) Appl. No.: 11/028,227

(22) Filed: Jan. 4, 2005

(65) Prior Publication Data

US 2005/0208301 A1 Sep. 22, 2005

Related U.S. Application Data

(63) Continuation of application No. PCT/JP03/08564, filed on Jul. 4, 2003.

(30) Foreign Application Priority Data

Jul. 4, 2002 (JP) ............................ 2002-196363
May 22, 2003 (JP) ............................ 2003-144919

(51) Int. Cl.
*B32B 5/66* (2006.01)

(52) U.S. Cl. ...................... 428/323; 428/328; 428/402; 428/403; 428/404; 428/407

(58) Field of Classification Search ................. 428/323, 428/328, 402, 403, 404, 407
See application file for complete search history.

(56) References Cited

FOREIGN PATENT DOCUMENTS

| | | | |
|---|---|---|---|
| EP | 1220240 | A1 * | 3/2001 |
| JP | 47602-1979 | | 10/1980 |
| JP | 113561/1984 | | 2/1986 |
| JP | 63-105412 | | 5/1988 |
| JP | 6-97325 | | 4/1994 |
| JP | 9-45133 | A | 2/1997 |
| JP | 10-174333 | | 6/1998 |
| JP | 11-69687 | A | 3/1999 |
| JP | 11-71498 | | 3/1999 |
| JP | 11-92624 | | 4/1999 |
| JP | 11-323162 | | 11/1999 |
| JP | 2000-294061 | A | 10/2000 |
| JP | 2000-297204 | A | 10/2000 |
| JP | 2001-61247 | A | 3/2001 |
| JP | 2002-93257 | | 3/2002 |
| JP | 2002-118997 | A | 4/2002 |
| JP | 2003-209209 | | 7/2003 |
| JP | 2003-321594 | | 11/2003 |
| WO | WO 99/66515 | A1 | 12/1999 |
| WO | 01/16965 | A1 * | 3/2001 |
| WO | WO 01/16965 | A1 | 3/2001 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

The present invention provides a solution to the above-described drawbacks, and more specifically, as the tape-like or sheet-like insulation member, the resin matrix in which the first particles having a heat conductivity of 1 W/mK or higher and 300 W/mK or lower, that are diffused in the resin matrix, and the second particles having a heat conductivity of 0.5 W/mK or higher and 300 W/mK or lower, are diffused, is employed.

7 Claims, 13 Drawing Sheets

HIGHLY HEAT CONDUCTIVE INSULATING MEMBER, METHOD OF MANUFACTURING THE SAME AND ELECTROMAGNETIC DEVICE

CROSS REFERENCE TO RELATED APPLICATIONS

This is a Continuation Application of PCT Application No. PCT/JP03/08564, filed Jul. 4, 2003, which was published under PCT Article 21(2) in Japanese.

This application is based upon and claims the benefit of priority from prior Japanese Patent Applications No. 2002-196363, filed Jul. 4, 2002; and No. 2003-144919, filed May 22, 2003, the entire contents of both of which are incorporated herein by reference.

BACKGROUND OF THE INVENTION

1. Field of the Invention

The present invention relates to a tape-like or sheet-like highly heat conductive insulating member used in an electromagnetic coil of an electromagnetic device such as a power generator, electric motor or transformer, and a method of manufacturing the insulating member. The present invention further relates an electromagnetic coil manufactured employing a high-heat conductive insulating member.

2. Description of the Related Art

In order to improve an electromagnetic device, that is, to achieve a higher efficiency, a smaller size and a lower production cost, it is necessary to improve the cooling performance of its electromagnetic coil. Here, one of the measures to improve the cooling performance of the electromagnetic coil is that the electro-insulating tape and sheet material used for a peripheral member of the electromagnetic coil should be made into a high heat conductivity type.

The heat conductivity of a conventional electro-insulating member is about 3 to 37 W/mK. Jpn. Pat. Appln. KOKAI Publication No. 11-71498 discloses that the components of the matrix resin are changed to increase the amount of the filling material, as its object, that is, increasing the heat conductivity of the electro-insulating member. However, the heat conductivity of the electro-insulating member of this prior art document is not sufficient, and further the resins that can be employed for this reference technique are limited to special components only.

Jpn. Pat. Appln. KOKAI Publication No. 2002-93257 discloses a highly heat conductive mica matrix sheet having a backing member containing inorganic powder, as the electro-insulating member used for an electromagnetic coil. However, in the insulating member of this prior art document, the heat conductive material that is used for the backing member does not exhibit a sufficiently high heat conductivity. Thus, as an insulating layer of an electromagnetic coil, the heat conductivity is not sufficient.

Jpn. Pat. Appln. KOKAI Publication No. 11-323162 is directed to an improvement of the heat conductivity of an insulating layer, and discloses that the heat conductivity of the resin can be improved by using a crystalline epoxy resin as the resin for the insulating layer. However, the crystalline epoxy resin of this prior art document is in a solid state at room temperature, and therefore it is difficult to handle it.

Jpn. Pat. Appln. KOKAI Publication No. 10-174333 discloses an electromagnetic coil in which heat conductive sheets are alternately wound around a wire-wound conductor, for the object of improving the heat conductivity of an insulating layer. However, in the electromagnetic coil of this prior art reference, the heat transmission is insulated by the mica layer, and therefore it is difficult to achieve a high heat conductivity.

As described above, the conventional insulating members entail such drawbacks that a sufficient heat conductivity cannot be obtained and the production takes much labor, time and high cost.

BRIEF SUMMARY OF THE INVENTION

The object of the present invention is to provide a widely usable highly heat conductive insulating member that can exhibit a highly heat conductive without having to use very limited components of resin and that can be easily manufactured, as well as a method of manufacturing the insulating member.

Further, the object includes the provision of an electromagnetic coil that employs such a highly heat conductive insulating member.

The highly heat conductive insulating member according to the present invention is characterized by comprising: a resin matrix; first particles having a heat conductivity of 1 W/mK or higher and 300 W/mK or lower, that are diffused in the resin matrix; and second particles having a diameter of 0.15 times or less of that of the first particles and having a heat conductivity of 0.5 W/mK or higher and 300 W/mK or lower, that are diffused in the resin matrix.

When the highly heat conductive insulating member of the present invention is used in combination with a conventional mica tape to prepare a wire-wound conductor (Cu coil), an electromagnetic coil having both of an excellent heat radiating property (cooling performance) and an excellent insulating property at the same time can be provided. It is only natural that the highly heat conductive insulating member of the present invention can be solely used.

The highly heat conductive insulating member according to the present invention is characterized by comprising, as a backing layer, a resin matrix having the first and second particles, and characterized in that the backing material layer is attached to a mica layer to form a tape-like or sheet-like shape.

The highly heat conductive insulating member of the present invention is a tape-like or sheet-like highly conductive insulating member including a mica layer and a backing material layer, the insulating member characterized in that the mica layer includes: mica paper comprising mica scales; and second particles having a diameter of 0.15 times or less of that of the mica scales and having a heat conductivity of 0.5 W/mK or higher and 300 W/mK or lower, that are diffused in the mica paper.

The reason why the lower limit value of the heat conductivity $\lambda$ of the first particles is set to 1 W/mK is that a desired heat radiating property cannot be obtained if the heat conductivity $\lambda$ is lower than this limit value. The reason why the upper limit value of the heat conductivity $\lambda$ of the first particles is set to 300 W/mK is that if metal powder or carbon nanotube that has a heat conductivity $\lambda$ higher than this limit value is used to fill, the heat conductivity $\lambda$ becomes excessive to impair the insulating property of the material.

The reason why the lower limit value of the heat conductivity $\lambda$ of the second particles is set to 0.5 W/mK is that a desired heat radiating property cannot be obtained if the heat conductivity $\lambda$ is lower than this limit value. The reason why the upper limit value of the heat conductivity $\lambda$ of the first particles is set to 300 W/mK is substantially the same as that of the first particles. Here, in the case where the condition that the volume content of the second particles is set to 33.3% by volume or less is satisfied (see FIG. 30), it is possible to use a limited amount of a metal such as gold, cupper or iron, or carbon as the second particles for filling. This is because if the condition is satisfied, the insulating property of the material will not be impaired.

In the present invention, the diameter of the second particles is set to 0.15 times or smaller as that of the first particles. This is because if the ratio in particle diameter of the second particles with respect to the first particles becomes closer to 0.15, the heat conductivity λ decreases as shown in FIG. 7.

It is preferable that the diameter of the first particles should be set in a range of 0.05 μm or more and 100 μm or less (50 nm to 105 nm). If the diameter of the first particles is less than 0.05 μm, it becomes difficult to disperse the particles uniformly in the layer, and as a result, the electric breakdown strength may be deteriorated in some cases. On the other hand, if the diameter of the first particles exceeds 100 μm, the flatness of the tape member or sheet member is impaired, and further the thickness becomes uneven easily.

Further, the diameter of the second particles is set to 0.15 times or smaller as that of the mica scales. This is because if the ratio in particle diameter of the mica scales with respect to the second particles becomes closer to 0.15, the heat conductivity λ decreases as in the above-described case.

The first particles are made of one or more types selected from the group consisting of boron nitride, aluminum nitride, aluminum oxide, magnesium oxide, silicon nitride, chromium oxide, aluminum hydroxide, artificial diamond, diamond-like carbon, carbon-like diamond, silicon carbide, laminar silicate clay mineral and mica. This is because the particles of these materials exhibits, at a normal state, a heat conductivity λ of 1 W/mK or more and 300 W/mK or less.

The second particles are made of one or more types selected from the group consisting of boron nitride, carbon, aluminum nitride, aluminum oxide, magnesium oxide, silicon nitride, chromium oxide, aluminum hydroxide, artificial diamond, diamond-like carbon, carbon-like diamond, silicon carbide, gold, cupper, iron, laminar silicate clay mineral and mica. It is particularly preferable that the second particles are made of either one of carbon and aluminum oxide. Carbon particle such as of carbon black is appropriate for improving the heat conductivity λ of the material of the present invention. Further, aluminum oxide particle is suitable since it not only improves the heat conductivity λ of the material of the present invention but also it does not impair the insulating property of the material.

The content of the second particles in the backing material layer should preferably be set to 0.5% by volume or more, and most preferably, it should be set to 1% by volume or more. This is because if the content of the second particles is increased, the heat conductivity λ increases accordingly. In particular, if the content of the second particles is 1% by volume or more, the heat conductivity λ of the material dramatically improves as can be seen in FIG. 3 and FIG. 29.

It is preferable that the content of the second particles should be set to 33.3% by volume or less with respect to the total amount of the second particles and the resin, and most preferably, it should be set to 23% by volume or less. This is because if the content of the second particles becomes excessive, the electric conductivity a increases excessively. In particular, if the content of the second particles exceeds 33.3% by volume, the electric conductivity σ becomes excessive as can be seen in FIG. 30, thereby deteriorating the insulating property of the material.

The backing material layer may be provided on both surfaces of the mica layer or the mica layer may be provided on both surfaces of the backing material layer. (See FIG. 15.)

The backing material layer may be made wider than the mica layer, or the mica layer may be made wider than the backing material layer. (See FIG. 18.)

The total thickness of the highly heat conductive insulating member is set to 0.2 to 0.6 mm in the case of tape, whereas it is set to 0.2 to 0.8 mm in the case of sheet. The ratio in thickness between the mica layer and backing material layer should preferably set in a range of 6:4 to 4:6, and more preferably, in a range of 11:9 to 9:11.

Further, the method of manufacturing a highly heat conductive insulating member according to the present invention, is a method of manufacturing a tape-like or sheet-like highly heat conductive insulating member having a mica layer and a backing material layer, and the method is characterized by comprising: (a) kneading first particles having a heat conductivity of 1 W/mK or higher and 300 W/mK or lower, second particles having a diameter of 0.15 times or less of that of the first particles and having a heat conductivity of 0.5 W/mK or higher and 300 W/mK or lower, and a resin solution at a predetermined ratio; (b) impregnating the kneaded material to a impregnation member; (c) heating the kneaded material impregnated in the impregnation body to cure the kneaded material, thereby obtaining the backing material layer; (d) adhering the backing material layer and mica paper together; and (e) pressing the backing material layer and mica paper adhered together from upper and lower surfaces by a roller press to form it into a tape- or sheet-like shape.

The above-mentioned impregnation member may be made of either one of glass cloth and resin film. In the case where the backing material layer is formed of glass cloth, the process B1 (steps S1 to S3) shown in FIG. 1 is employed. In the case where the backing material layer is formed of resin film, the process B2 (steps S11 and S12) shown in FIG. 13 is employed. As the roll press, a hot roll press method should preferably be used. In general, the roll press has a single pressing operation just one time, but it may have a multi-step press in which the press is repeated two to three times.

Further, the method of manufacturing a highly heat conductive insulating member according to the present invention, is a method of manufacturing a tape-like or sheet-like highly heat conductive insulating member having a mica layer and a backing material layer, and the method is characterized by comprising: (i) mixing second particles having a heat conductivity of 0.5 W/mK or higher and 300 W/mK or lower, mica scales and a solvent at a predetermined ratio and stirring the mixture, the second particles having a diameter of 0.15 times or less of that of the mica scales; (ii) filtrating the stirred mixture with a predetermined filter and drying the filtered resultant, thereby obtaining mica paper; (iii) adhering the mica paper and backing material layer together; and (iv) pressing the mica paper and backing material layer adhered together from upper and lower surfaces by a roller press to form it into a tape- or sheet-like shape.

As the above-mentioned solvent, water or various types of alcohols can be used, and it is preferable here that water should be used. In the case where the mica paper is used made using water, the steps S21 to S23 shown in FIG. 9 are employed. Mica scales have a high aspect ratio and therefore they easily aggregate to consolidate. Thus, even after the solvent volatilizes, the shape of the consolidated body is maintained and the highly heat conductive particles are well retained. It should be noted that when a slight amount of binder resin is added, the shape maintaining property and particle retaining property are improved.

The electromagnetic coil according to the present invention is characterized in that a wire-wound conductor is covered for insulation with the above-described tape-like highly heat conductive insulating member.

The electromagnetic device according to the present invention is characterized by comprising the above-described electromagnetic coil.

The term "tape" used in this specification is meant to be a slender band-like member to be wound repeatedly around a section that requires to be covered for insulation.

The term "sheet" used in this specification is meant to be not only a member to be wound around a section that requires to be covered for insulation, but also a member having such a width that it can cover the section. The insulating sheet is used to cover, for example, a soldered connection portion between electromagnetic coils for insulation.

The term "mica" used in this specification is meant to cover not only natural mica produced from the world of nature, but also artificial mica that is industrially manufactured. There are two types of mica, that is, calcined mica and non-calcined mica. It is preferable in the present invention that calcined mica should be used. The calcined mica, as it is calcined at a predetermined temperature, transforms further into scale-like shapes, thereby increasing the electric insulating property.

The term "mica paper" used in this specification is meant to be a thin film or foil obtained by mixing mica scales into a solvent (such as water or an alcohol), stirring the mixture, filtrating the mixture in a manner of papermaking, and drying the filtrated mixture. The thus obtained mica paper is cut into a predetermined size, and in this manner, the mica tape and mica sheet are obtained.

The term "carbon" used in this specification is meant to cover carbon-based materials that has such a structure in which layers formed by π-bond are joined together by intermolecular force, and it is a general term that includes carbon black, contact black, channel black, roll black, disk black, thermal black, gas black, furnace black, oil furnace black, naphthalene black, anthracene black, acetylene black, animal black, vegetable black, Ketjen black and graphite.

The term "artificial diamond" used in this specification is meant to not include natural diamonds produced from the world of nature cover, but include diamonds that are industrially manufactured, that is, more specifically, those having such a texture in which carbon atoms are bonded together by sp3 bond to crystallize.

The term "diamond-like carbon" used in this specification is meant to be a carbon-based material relatively close to the carbon defined above, and more specifically, such a material in which the main portion thereof is made of carbon, and the diamond texture defined above is contained in a part thereof.

The term "carbon-like diamond" used in this specification is meant to be a carbon-based material relatively close to the diamond defined above, and more specifically, such a material in which the carbon and the diamond texture defined above are mixedly present.

The term "binder resin" used in this specification is meant to be a filling material used to hold the highly heat conductive particles fixed in the backing material layer or mica layer. For the material of the present invention, the components of the resin are not particularly specified, but in general, any one of an epoxy resin, polypropylene resin and silicone resin (silicone rubber) should be employed.

DETAILED DESCRIPTION OF THE INVENTION

Various preferred embodiments of the present invention will now be described with reference to accompanying drawings.

FIRST EMBODIMENT

The first embodiment of the present invention will now be described with reference to FIGS. 1 to 8.

Figure 1:
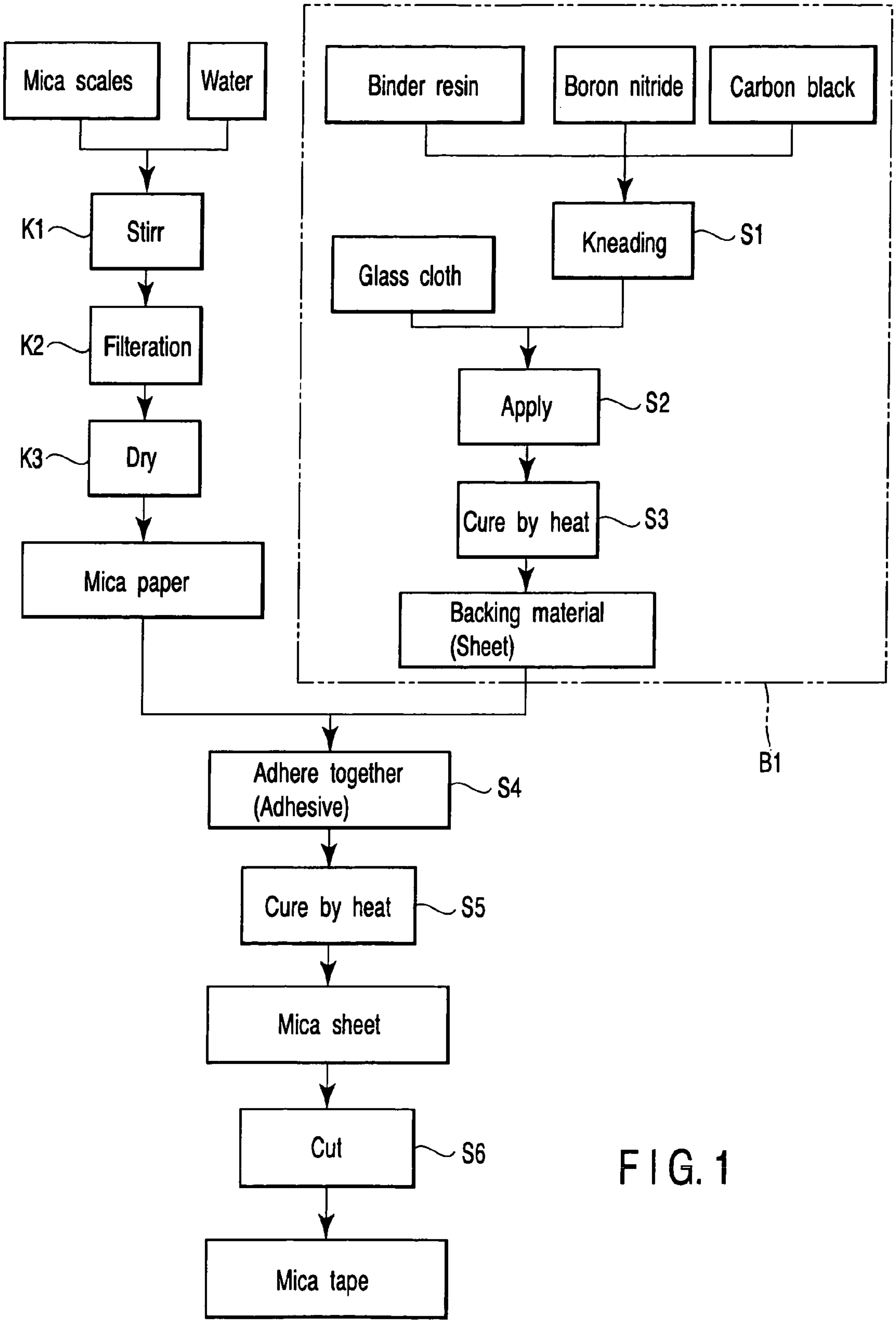
FIG. 1 is a diagram illustrating a flowchart of a method of manufacturing a highly heat conductive insulating member according to an embodiment of the present invention.
Figure 2:
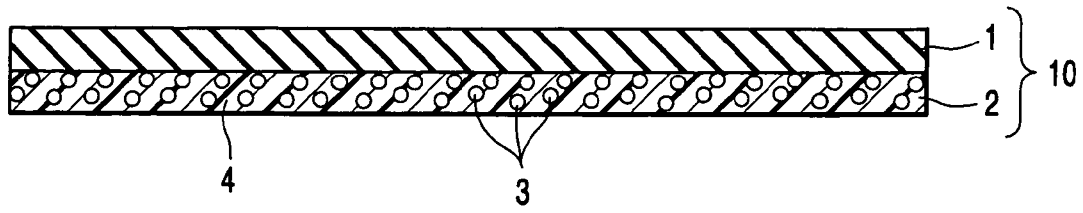
FIG. 2 is a schematic diagram showing a cross section of a highly heat conductive insulating member according to a first embodiment of the present invention.

First, with reference to FIG. 1, the manufacture of the mica tape of this embodiment will be described. 300 cc of water was blended to 2.826 g of mica scales and the mixture was stirred (Step K1). Here, it is possible to add a slight amount of epoxy resin as the binder.

The thus obtained stirred mixture was allowed to pass a grid having a lattice size of, for example, 0.05 mm×0.05 mm in a manner of papermaking, thereby preparing a raw sheet (Step K2). The raw sheet was heated to a predetermined temperature and thus dried, thereby obtaining mica paper 1 (Step K3).

In a process B1 for manufacturing a backing material layer of this embodiment, first, a binder resin, boron nitride particles and carbon black particles were blended at a ratio of 24.7:74.2:1.1 and the mixture was kneaded (Step S1). In this embodiment, Asahi Thermal (Tradename) of Asahi Carbon Co., Ltd. was used as the carbon black. The average diameter of the carbon black particles was 90 nm. The shape of the carbon black particles was spherical. Further, in this embodiment, HP-1CAW (product model number) of Mizushima Ferroalloy Co., LTd. was used as boron nitride. The distribution of the particle diameters was 14 to 18 μm, and the average diameter of the boron nitride particles was 16 μm. The crystalline structure of the boron nitride particles was hexagonal and it had a scale shape or a plane shape. It is alternatively possible to use HP-6 (product model number) of Mizushima Ferroalloy Co., LTd. as boron nitride.

The above-described kneaded material was applied on a glass cloth having a thickness of 0.33 mm (Step S2). The amount of the kneaded material applied per unit area was 400 g/m2. The applied material was heated to a temperature of 120° C. to cure, and thus a backing material layer 2 was obtained (Step S3).

The thus obtained mica paper 1 and the backing material 2 were adhered together with an adhesive (Step S4). The adhesive was applied onto either one of the mica paper 1 and the backing material 2, and they were attached together and then subjected to hot roll press. The adhesive employed here was an epoxy resin type. In the hot roll press, the resultant was heat to a temperature of 150° C. and thus the adhesive, mica paper 1 and backing material 2 were cured and thus a mica sheet was obtained (Step S5). The processes of Steps S4 and S5 are carried out continuously and consequently a wide and long mica sheet is obtained. The obtained mica sheet was cut into a width of 30 mm to prepare a mica tape 10 shown in FIG. 2 (Step S6). The obtained mica tape 10 had boron nitride particles (first particles) having a heat conductivity of 1 W/mK or higher and carbon black particles (second particles) having a heat conductivity of 0.5 W/mK or higher obtain, diffused in a resin 4 of a backing material layer 2.

In the following descriptions, a laser flash method was employed to evaluate and measure the heat conductivity λ of the tape member (or sheet member) In this embodiment, TC-3000-NC of ULVAC RIKO, Inc. was used as a heat conductivity measuring device. More specifically, a pulse laser beam was irradiated onto one side of a sample having a thickness of 1 mm, and the rise in temperature on the opposite side (rear side) was measured to evaluate the heat conductivity λ.

For the measurement of the diameter of the particles, a laser analysis type graininess distribution measuring device was employed. In this embodiment, LMS-24 of Seishin Enterprise Co., Ltd. was used as the particle diameter measuring device. The particle diameter measured was the average of the diameters.

Figure 3:
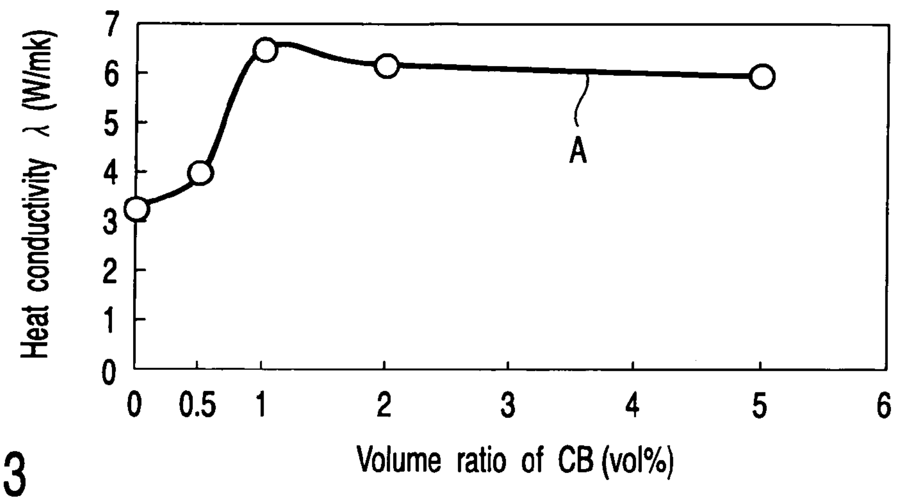
FIG. 3 is a diagram showing a characteristic curve indicating the effect of the addition of carbon black with respect to the heat conductivity of an insulating tape containing boron nitride.

FIG. 3 is a diagram showing a characteristic curve indicating the dependency of the heat conductivity on the carbon black filling amount, with the horizontal axis indicating the volume ratio (vol %) of carbon black and the vertical axis indicating the heat conductivity λ obtained when carbon black is diffused in the epoxy resin. The carbon black particles used here had a heat conductivity of 1 W/mK and an average particle diameter of 90 nm. The boron nitride particles used here had a heat conductivity of 60 W/mK and an average particle diameter of 16 μm. In this figure, characteristic curve A was obtained by connecting points plotted as results of changing the carbon black filling amount to 0%, 0.5%, 1%, 2% and 5% in ratio by volume.

As can be understood from the characteristic curve A, with a slight amount of carbon black added to the epoxy resin, a heat conductive sheet having a high heat conductivity can be obtained. Thus obtained heat conductive sheet 2, which served as the backing material, and the mica paper 1 prepared by filtrating the mica scales, were attached together, and put through a slit, thereby preparing a mica sheet. In this case, the mica layer 1 and heat conductive sheet 2 (backing member) were adhered together with a bisphenol A type epoxy resin adhesive.

The backing material member of the mica sheet (tape) prepared as above had a high heat conductivity, and therefore as compared to a mica tape containing boron nitride solely, (which is a conventional product), a high heat conductivity can be achieved.

Table 1 indicates the heat conductivity index and composition of the mica tape manufactured by setting the thickness ratio between the mica layer 1 and heat conductive sheet 2 to 1:1. The term “heat conductivity index” used here is a relative value having no unit calculated with respect to a reference value of Comparative Example 1 being set to 1.

TABLE 1

| | Comparative Example 1 | Comparative Example 2 | Example 1 |
|---|---|---|---|
| Boron Nitride | 0 | 60 | 60 |
| Carbon black | 0 | 0 | 5 |
| Resin | 100 | 40 | 35 |
| Heat conductivity index | 1 | 1.8 | 1.93 |

In Comparative Examples 1 and 2, the cases of a tape using polyethyleneterephthalate and a tape using boron nitride solely, which were used as backing members, were indicated together with Embodiment 1.

The tape (Comparative Example 2) filled with boron nitride exhibited a heat conductivity λ of 1.8 times higher as compared to the case of the tape (Comparative Example 1). Further, the tape to which carbon black added (That is, Embodiment 1) exhibited a heat conductivity λ of 1.93 times higher as compared to the reference example.

Figure 4:
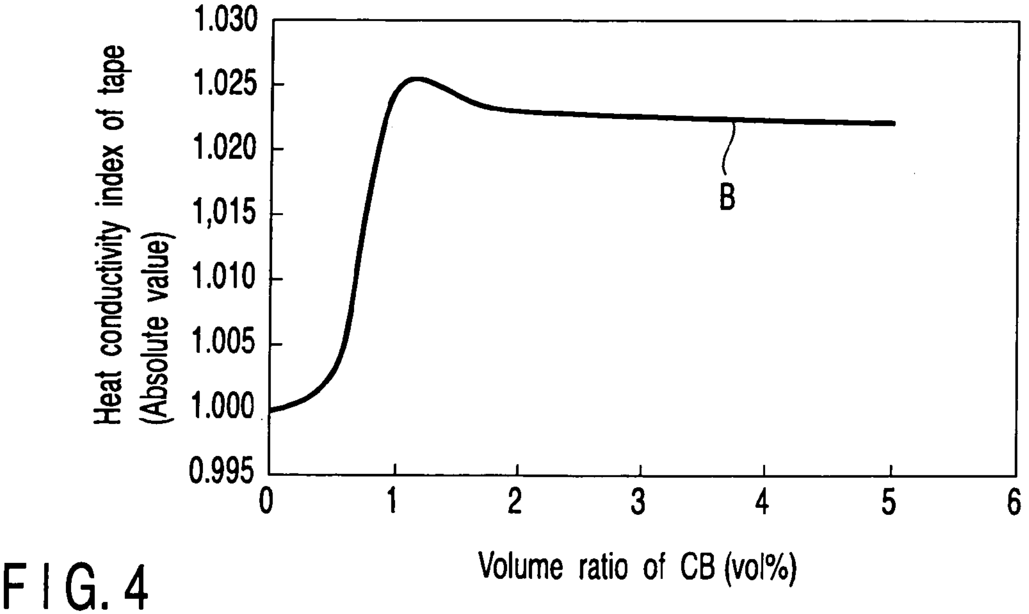
FIG. 4 is a diagram showing a characteristic curve indicating the effect of carbon black on the heat conductivity of the insulating tape containing boron nitride.

FIG. 4 is a diagram showing a characteristic curve indicating the dependency of the heat conductivity of the mica tape on the carbon black filling amount, using the carbon black filling amount of FIG. 3 as a parameter, with the horizontal axis indicating the volume ratio (vol %) of carbon black and the vertical axis indicating the heat conductivity index of the mica table. The term “heat conductivity index” used here is a relative value having no unit calculated with respect to a reference value of Comparative Example 2 being set to 1.

As is clear from the characteristic curve B, the heat conductivity of the mica tape was increased by adding carbon black. In particular, when the carbon black filling amount was 1% by volume or more, an increase of about 2.5% in heat conductivity index was achieved. Therefore, the heat conductivity λ of the mica tape is increased in proportional to the heat conductivity λ of the backing member.

As described above, when carbon black was added further to the composite material of boron nitride and resin, a sheet with a high heat conductivity was obtained. With use of this sheet as the backing member, a mica tape having a high heat conductivity was manufactured.

Figure 5:
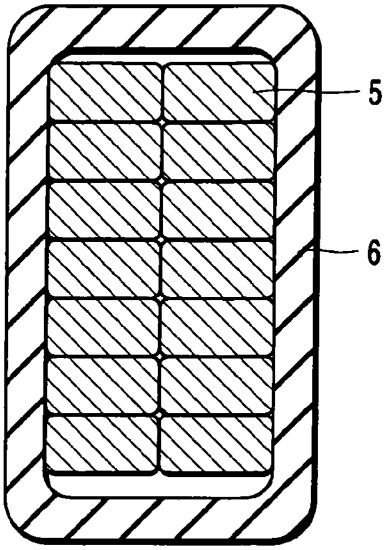
FIG. 5 is a schematic diagram showing a cross section of an electromagnetic coil.

Next, with reference to FIG. 5, a method of manufacturing a coil will now be described.

The mica tape 10 was wound, to have a predetermined thickness, around an outer circumference of wire-wound conductors 5 (bar coil) having a rectangular cross section. Then, a release tape (not shown) was further wound around the resultant. Barrel-shaped rubber-made holder jigs (not shown) were pressed respectively against four surfaces of the wound body. Iron plates (not shown) having a thickness of 2 mm were each inserted between a respective holder jig and the wound body. Further, a heat-shrinkable tube (not shown) was wound around the outer circumference of the holder jigs for 3 times while overlapping by ⅔. The diameter of the heat-shrinkable tube was about 50 mm. The wound body was immersed in an epoxy resin solution and thus the epoxy resin was impregnated to the body under a vacuum atmosphere. After the impregnation of the resin, the wound body was loaded into a heat furnace, where the epoxy resin was cured under heating conditions of a temperature of 150° C. for 24 hours. The heat-shrinkable tube, holder jigs, iron plates and release tape were removed, thereby obtaining an electromagnetic coil.

The mica tape 10 of the electromagnetic coil thus manufactured had a high heat conductivity. As a result, an insulating layer 6 having a high heat conductivity was obtained. The electromagnetic coil thus obtained exhibited an excellent cooling performance, and therefore a current supplied to the wire-wound conductor 5 could be increased, thereby achieving a high efficiency. Alternatively, for the same efficiency, the cross sectional area of the wire-wound conductor 5 could be decreased, thereby making it possible to reduce the size of the electromagnetic coil. Consequently, the production cost for the electromagnetic coil was decreased.

With use of an electromagnetic coil having the above-described insulating layer 6, a power generator of a class of 300 MW could increase the heat conductivity of its main insulation from 0.22 W/mK, which is a conventional performance, to about 1 W/mK. Further, the increase in temperature of the electromagnetic coil could be decreased from 70K to 40K. In this manner, it becomes possible to increase the current density supplied to the electromagnetic coil, and therefore the amount of copper used can be reduced. In fact, it became possible to increase the current density supplied to the electromagnetic coil, and therefore the amount of copper used was cut down by about 30%.

In this embodiment, a tape member having a high heat conductivity can be obtained easily in a simple way, and further when the tape member is wound around a coil conductor for insulation cover, an electromagnetic coil having a high heat conductivity can be obtained. Further, an electromagnetic device of a reduced size can be manufactured at a low production cost.

In the above-described embodiment, boron nitride particles and carbon black particles were used as the material for forming the highly heat conductive backing material. It is considered that the high heat conductivity was achieved by replacing the resin layer with carbon black. More specifically, such a high heat conductivity can be obtained due to the main filling material that has a high heat conductivity and the carbon particles that fill the interstices of the filling material.

In this case, it is required for achieving a high heat conductivity that the main filling material (first particles) having a high heat conductivity should be filled at a high density, and therefore it is very important for the second particles, that is, for example, carbon black particles, to enter the interstices of the main filling material (first particles) densely filled.

Figure 6:
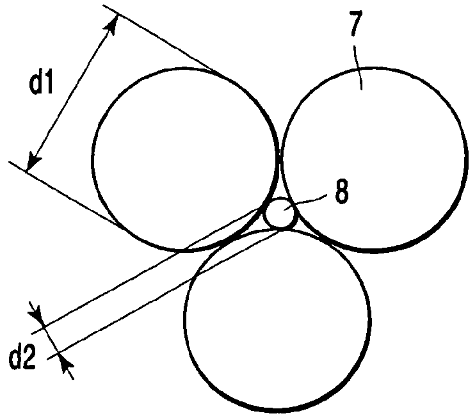
FIG. 6 is a diagram showing enlarged views of the first and second particles.

In order for the second filling material (second particles) 8 to enter the densely filled main highly heat conductive filling material (first particles) 7 as shown in FIG. 6, the grain diameter d2 of the second filling material 8 should be limited. In this manner, a heat conducting property of a high heat conductivity can be achieved.

Figure 7:
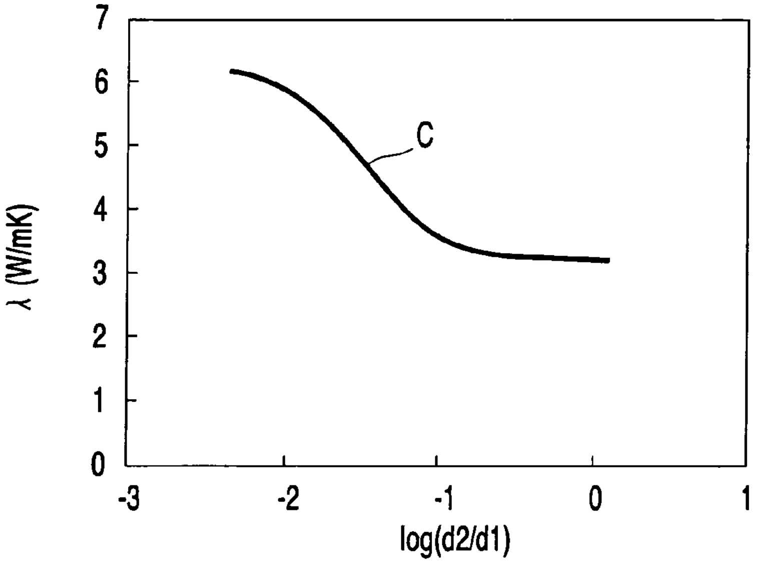
FIG. 7 is a diagram showing a characteristic curve indicating the relationship between the particle diameter ratio log (d2/d1) and the heat conductivity λ.

FIG. 7 is a diagram showing a characteristic curve indicating the change in the heat conductivity λ with respect to the particle diameter ratio between the second particles and first particles, with the horizontal axis indicating the log of the particle diameter ratio (d2/d1) between the second particles and first particles, and the vertical axis indicating the heat conductivity λ. As can be understood clearly from this figure, the heat conductivity λ is increased in a region where the particle diameter ratio between the second particles and first particles is smaller than about 0.1 times.

Figure 8:
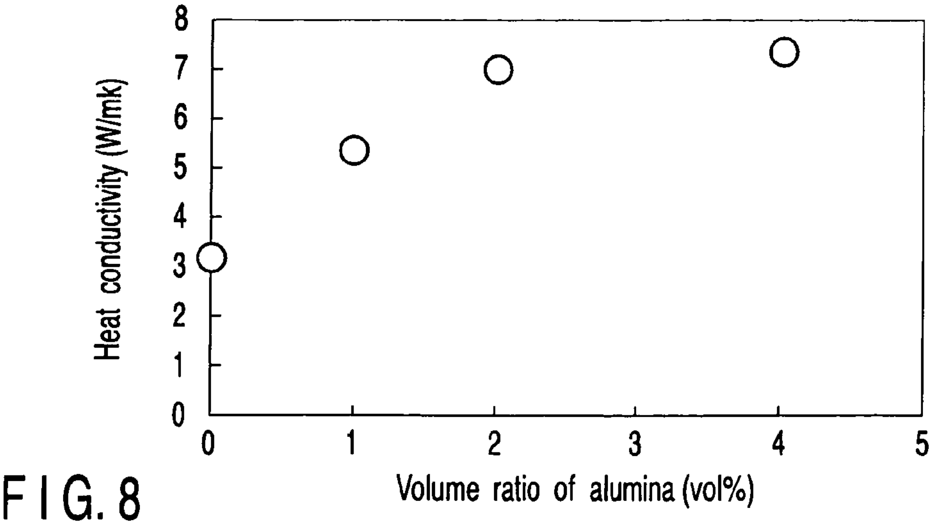
FIG. 8 is a characteristic diagram showing the relationship between the amount of aluminum oxide filled and the heat conductivity of the epoxy resin.

FIG. 8 is a characteristic diagram showing the plotted results of the examination regarding the relationship between the amount of aluminum oxide filled in the epoxy resin and the heat conductivity λ, with the horizontal axis indicating the volume content (% by volume) of aluminum oxide filled in the epoxy resin, and the vertical axis indicating the heat conductivity λ. Here, aluminum oxide particles having an average particle diameter of 70 nm was filled in the epoxy resin in place of the carbon black particles of an average particle diameter of 90 nm. As is clear from this figure, as the amount of the aluminum oxide particles filled was increased, the heat conductivity λ went up. In the case of the material to which the aluminum oxide particles were added in amount of 2% by volume in particular, a heat conductivity λ higher than 7 W/mK was obtained. It was found that when this material was used as the backing material, a high heat conductivity was obtained. Further, as compared to the carbon black particles, the aluminum oxide particles have a higher electric resistance, a tape with an excellent insulating property can be obtained.

The aluminum oxide particles had spherical shapes with an average diameter of 70 nm. In this embodiment, NanoTekAl2O3-HT (product model number) of CI Kasei Company Ltd. was used as the aluminum oxide particles.

In this embodiment, boron nitride was used as the first particles; however it is alternatively possible to use, in place of this material, aluminum nitride, aluminum oxide, magnesium oxide, silicon nitride, artificial diamond, diamond-like carbon or silicon carbide. With these substituting materials, a similar effect to that of the present embodiment can be obtained.

Meanwhile, in this embodiment, carbon black and aluminum oxide were used as the second particles; however it is alternatively possible to use, in place of this material, boron nitride, carbon, aluminum nitride, magnesium oxide, silicon nitride, artificial diamond, diamond-like carbon, silicon carbide, gold, copper, iron, laminar silicate clay mineral or mica. With these substituting materials, a similar effect to that of the present embodiment can be obtained.

SECOND EMBODIMENT

Figure 9:
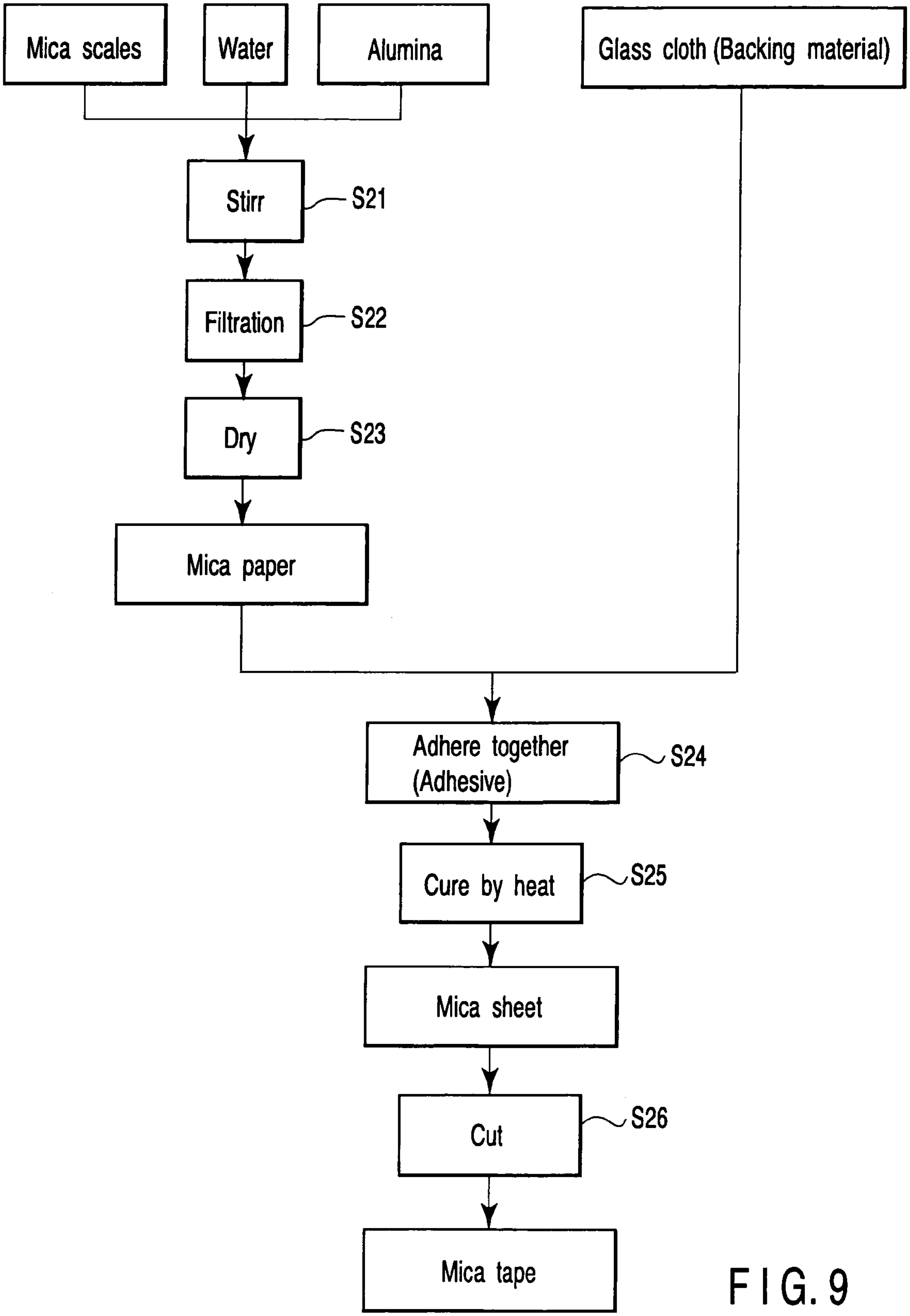
FIG. 9 is a diagram illustrating a flowchart of a method of manufacturing a highly heat conductive insulating member according to another embodiment of the present invention.

Next, the second embodiment will now be described with reference to FIGS. 9 to 11.

In the member of this embodiment, highly heat conductive particles were filled in the mica layer side. As the backing material, glass cloth 25 was used. 2.83 g of mica scales and 0.125 g of alumina particles were blended to 3000 cc of water, and the mixture was stirred (Step S21). In this embodiment, NanoTekAl2O3-HT (product model number) of CI Kasei Company Ltd. was used as the alumina particles. The average diameter of the alumina particles was 70 nm. The shape of the alumina particles was spherical. As the mica particles, sintered mica was used. The average diameter of the mica scales was 15 μm.

The thus obtained stirred mixture was allowed to pass a grid having a lattice size of, for example, 0.05 mm×0.05 mm in a manner of papermaking, thereby preparing a raw sheet (Step S22). The raw sheet was heated to 120° C. and thus dried, thereby obtaining mica paper (Step S23).

The above-described mica paper was adhered onto a glass cloth 25 using an adhesive (Step S24). The adhesive employed here was an epoxy resin type. In the hot roll press, the resultant was heat to a temperature of 150° C. and thus the adhesive, mica paper 1 and backing material 2 were cured, thereby obtaining a mica sheet (Step S25). The processes of Steps S24 and S25 are carried out continuously and consequently a wide and long mica sheet is obtained. The obtained mica sheet was cut into a width of 35 mm to prepare a mica tape 11A shown in FIG. 10 (Step S26).

Figure 10:
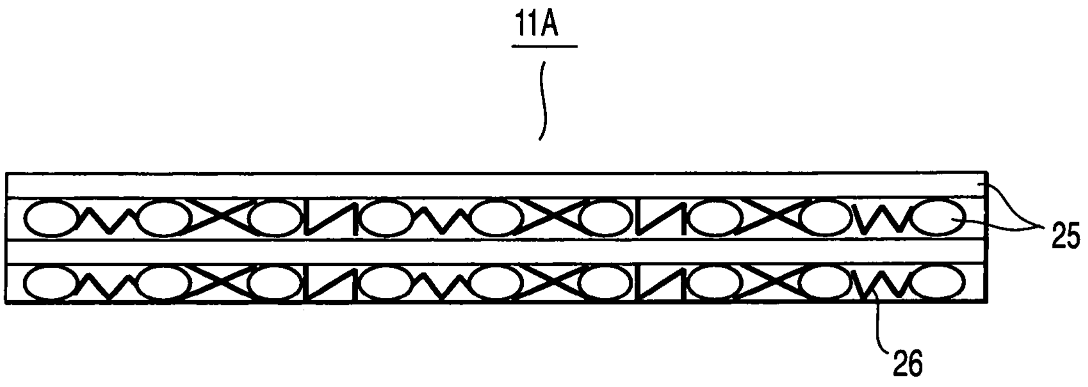
FIG. 10 is a schematic diagram showing a cross section of a backing material member (resin-impregnated glass cloth)

FIG. 10 shows a cross section of the mica tape 11A in which one of the highly heat conductive particles obtained in the above-described embodiment was dispersed in the glass cloth. When particles 26 having a high heat conductivity were supplied thereto while a film or a tape member is formed by impregnating resin into the glass cloth 25, a highly heat conductive tape (film) can be manufactured. Further, with use of thus obtained tape as a material for the mica tape, the mica tape will have a high heat conductivity.

Figure 11:
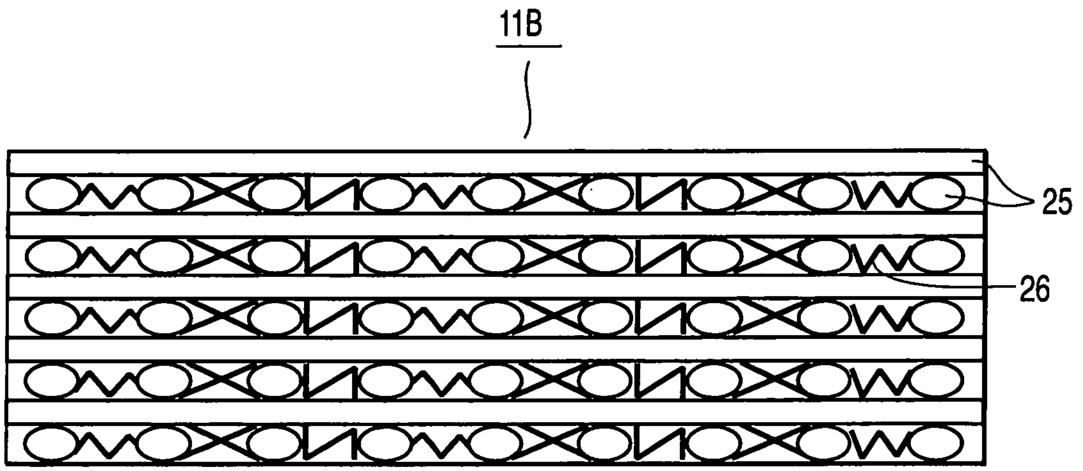
FIG. 11 is a schematic diagram showing a cross section of another backing material member (resin-impregnated glass cloth)

FIG. 11 is a schematic diagram showing a cross section of a tape 11B in which a plurality of tapes obtained in the above embodiment were layered. A highly heat conductive material was used for the resin part of the layered member, and thus a laminated member having a high heat conductivity can be manufactured.

THIRD EMBODIMENT

Figure 12:
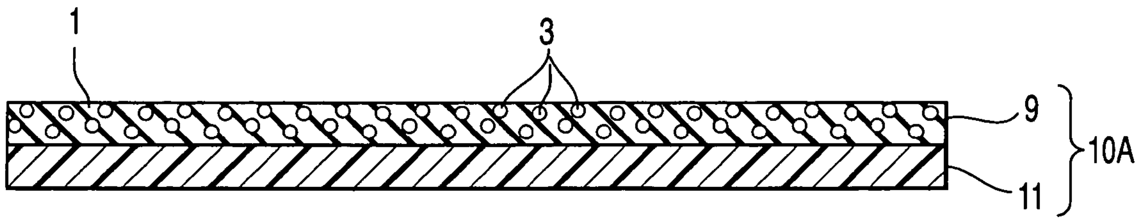
FIG. 12 is a schematic diagram showing a cross section of a highly heat conductive insulating member according to another embodiment of the present invention.

The third embodiment of the present invention will now be described with reference to FIG. 12. In a mica tape 10A of this embodiment, first particles having a heat conductivity of 0.5 W/mK or higher were filled and diffused in a mica layer 9. In this embodiment, a mica layer 11 was manufactured by an ordinary method and a heat conductive sheet 9 having a high heat conductivity was used as the backing material. In this case, the heat conductivity of the mica layer 11 is smaller as compared to that of the backing material layer 9, and therefore the mica layer 11 served as a heat barrier.

Here, while making the mica paper, alumina particles having an average particle diameter of 70 nm was blended into the mica paper. More specifically, the mica paper and the alumina particles were blended into distilled water and stirred, and the mixture was applied onto a cloth having a mesh of 0.05 μm. Then, the resultant was subjected to a dry process and thus a mica sheet was obtained. The mica sheet itself had a heat conductivity of about 0.6 W/mK; however, when resin was impregnated into the mica layer 11 formed of mica paper solely, the heat conductivity λ became 0.22 W/mK.

Meanwhile, the heat conductivity of the mica layer filled with the alumina particles was 0.35 W/mK. It is assumed that this is because impregnated resin is present between mica layers, and therefore phonon that is required for heat conduction was dispersed, thereby shortening the average free step of the phonon.

As in the above-described embodiment, an electromagnetic coil was formed using a tape of the present embodiment, and thus a min insulating layer having a high heat conductivity was formed.

In such a mica tape 10A, second particles 3 were filled and diffused in the mica layer 9, and thus a tape member having a high heat conductivity could be easily in a simple manner. Further, when the mica tape 10A was wound around the wire-wound conductor 5 for insulation cover, an electromagnetic coil having a high heat conductivity can be obtained. Further, an electromagnetic device of a reduced size can be manufactured at a low production cost.

FOURTH EMBODIMENT

Figure 13:
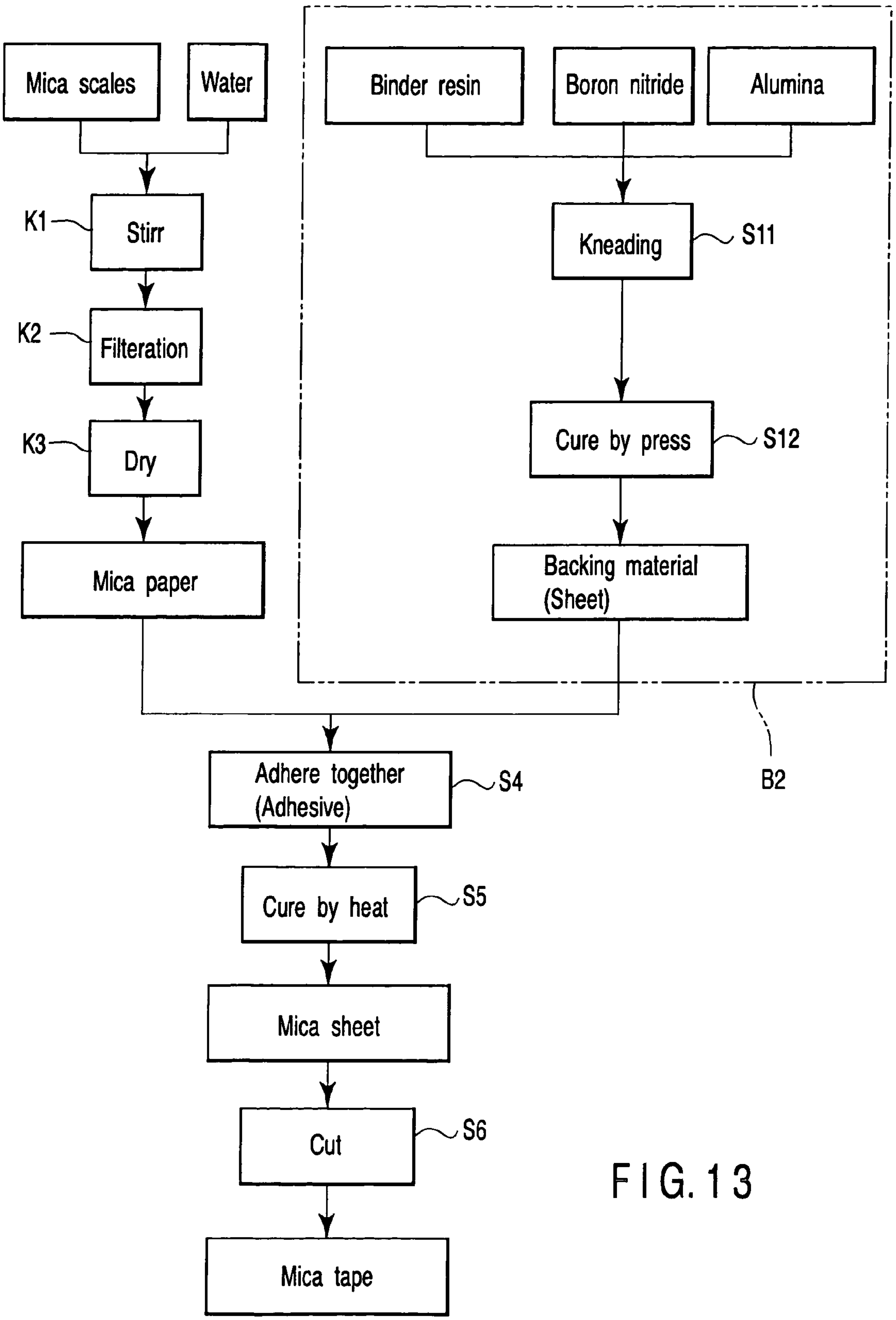
FIG. 13 is a diagram illustrating a flowchart of a manufacturing method according to another embodiment of the present invention.

The fourth embodiment in which a film (a substituting material for glass cloth) was used as the backing material layer will now be described with reference to FIG. 13. The present embodiment is substantially the same as the first embodiment described above except for the backing material manufacturing process B2. Therefore, in the description of this embodiment, the explanations of the mica paper processing steps K1 to K3 and mica tape processing steps S4 to S6 will be omitted.

In the backing material manufacturing process B2 of this embodiment, 0.13 g of a binder resin, 2.83 g of boron nitride particles and 0.125 g of alumina particles were kneaded together (Step S1). Thus kneaded material pressed an cured by a hot roll press machine at a temperature of 150° C., and thus a backing material was obtained (Step S12).

FIFTH EMBODIMENT

Figure 14:
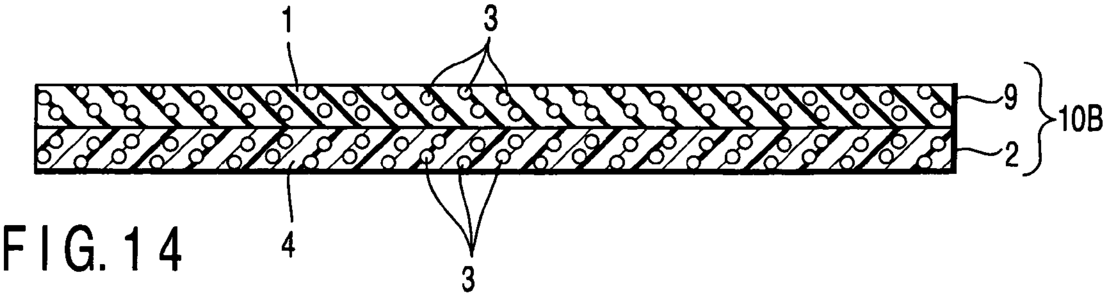
FIG. 14 is a schematic diagram showing a cross section of a highly heat conductive insulating member according to still another embodiment of the present invention.

The fifth embodiment of the present invention will now be described with reference to FIG. 14. A member 10B of this embodiment is a combination of the backing material layer 2 of the first embodiment and the mica layer 9 of the third embodiment. With this combination, the heat conductivity $\lambda$ of the mica tape 10B was further enhanced, thereby achieving an excellent heat radiating property. The heat conductivity of the mica tape 10B of this embodiment was estimated to be about 0.66 W/mK.

SIXTH EMBODIMENT

Figure 15:
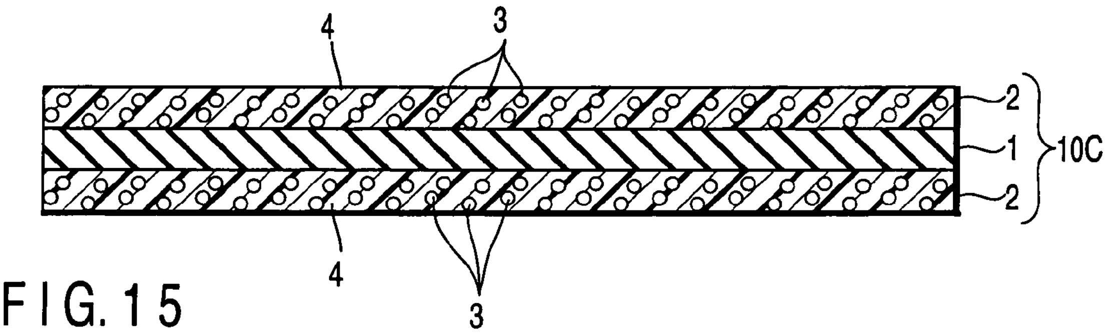
FIG. 15 is a schematic diagram showing a cross section of a highly heat conductive insulating member according to still another embodiment of the present invention.

The sixth embodiment of the present invention will now be described with reference to FIG. 15. A mica tape 10C of this embodiment was obtained by adhering a highly heat conductive backing material layer 2 filled with the first particles and second particles was adhered onto both surfaces of the mica layer 1.

According to this embodiment, a highly heat conductive material was used on both sides of the backing material layer 2, and with this structure, the heat conductivity of the mica tape 10C itself was increased. When the mica tape 10C was wound around the wire-wound conductor 5 for insulation cover, an electromagnetic coil having an excellent heat conductivity can be obtained.

SEVENTH EMBODIMENT

The seventh embodiment of the present invention will now be described with reference to FIG. 16, which shows a cross section of a main insulating layer of a resultant obtained by winding a mica tape 10 made of a low heat conductive layer (mica layer) 13 and a highly heat conductive layer (highly heat conductive backing material layer) 12 applied on one side of the layer 13 around the surface of the wire-wounded conductor 5 in such a manner that the overlapping portion between adjacent tape winding sections was displaced by one half of the tape width W (W/2). This main insulating layer 13 had such an arrangement that a low heat conductive layer 13 was always interposed between a highly heat conductive layer 12 and another highly heat conductive layer 12 adjacent thereto. In the insulating layer 6 that employs this structure 10D, the heat conductivity of the low heat conductive layer 13 was low, and therefore it was difficult to obtain a high heat conductivity.

EIGHTH EMBODIMENT

Figure 17:
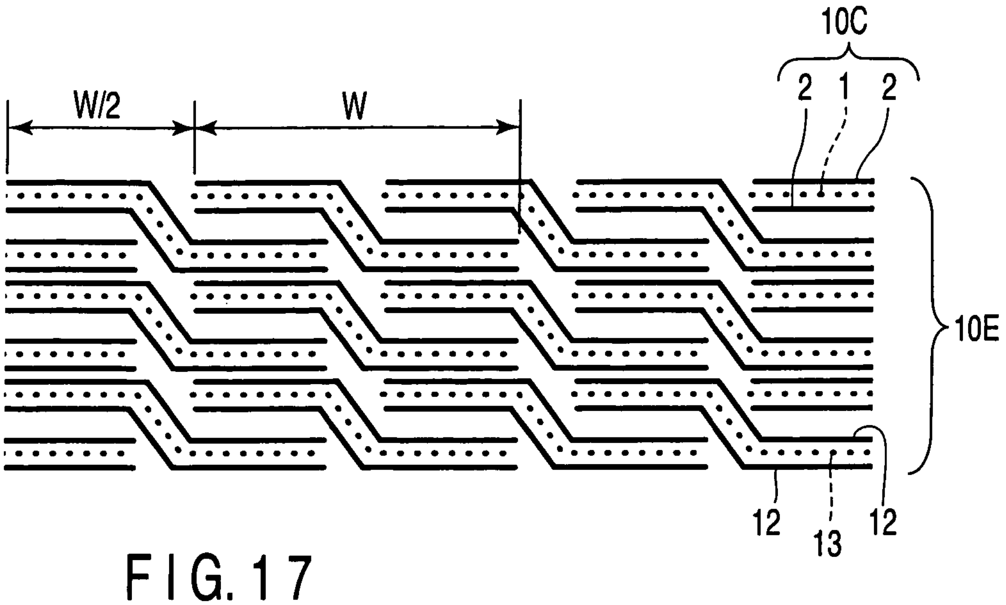
FIG. 17 is a schematic diagram showing a cross section of a highly heat conductive insulating member according to still another embodiment of the present invention.

The eighth embodiment of the present invention will now be described with reference to FIG. 17.

In this embodiment, a mica tape 10C made of a low heat conductive layer (mica layer) 13 and highly heat conductive layers 12 applied on both sides of the layer 13 was wound around the surface of the wire-wounded conductor 5 in such a manner that the overlapping portion between adjacent tape winding sections was displaced by one half of the tape width W (W/2). A cross section of the main insulating layer of thus obtained resultant is illustrated in the figure. In this structure 10E, a heat conductive path is formed in the main insulating layer as the backing materials having a heat conductivity are consecutively connected together. Therefore, with the highly heat conductive layers 12 formed on respective sides of the low heat conductive layer 13, it becomes possible to obtain a high heat conductivity.

By employing thus manufactured mica paper and the backing material presented in the first embodiment, a mica tape having a high heat conductivity was obtained.

As described above, both sides of the low heat conductive layer (mica layer) have the first particles that have a heat conductivity of 1 W/mK or higher, and with this structure, it becomes possible to obtain an electromagnetic coil with a high heat conductivity, easily. Further, an electromagnetic device with a high heat conductivity, can be easily manufactured.

The above-described case has such a structure in which a mica layer is used as a low heat conductive layer and the layer with a relatively low conductivity is sandwiched between highly heat conductive layers. However, when the mica layer is used as a highly heat conductive layer, it is possible to obtain a high heat conductivity by sandwiching the backing material layer with highly heat conductive mica layers. More specifically, when a mica layer containing the second particles having a heat conductivity of 0.5 W/mK or higher is formed on both side of the backing material layer, it is possible to obtain an electromagnetic coil and electromagnetic device that have a high heat conductivity and that can be easily manufactured.

NINTH EMBODIMENT

The ninth embodiment of the present invention will now be described with reference to FIG. 18.

A mica tape 10F of this embodiment was made to have such a structure that a highly heat conductive backing material layer 2 was wider than a mica layer 1. In other words, a width W2 of the backing material layer 2 was set larger than a width W1 of the mica layer 1.

Figure 19:
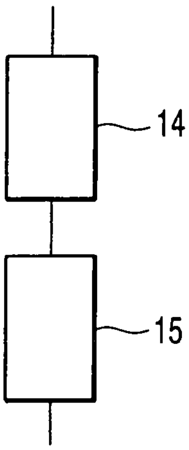
FIG. 19 is an equivalent circuit diagram conceptually indicating the heat conductivity of the main insulation layer of a highly heat conductive insulating member.
Figure 21:
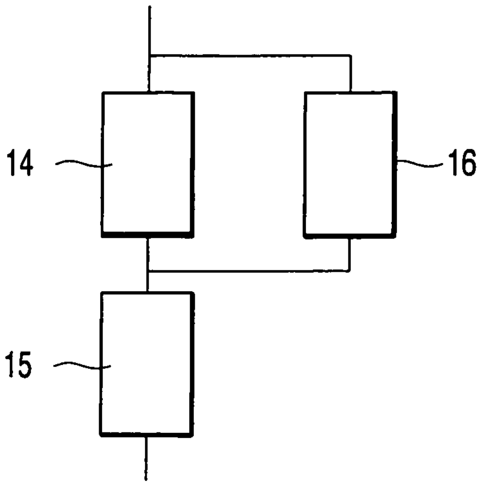
FIG. 21 is an equivalent circuit diagram conceptually indicating the heat conductivity of the main insulation layer of another highly heat conductive insulating member.

In the following descriptions, such equivalent circuits that are shown in FIGS. 19 and 21 will now be considered in order to calculate out the heat conductivity of the main insulating layer.

In the case of the main insulating layer, a layer having a high heat conductivity and a relatively low heat conductive layer are combined together to form the main insulating layer. The reason why there is a low conductivity is as follows. That is, the main insulating layer is formed originally to obtain electric insulation. However, the highly heat conductive material used in the present invention that uses a filling material may cause a decrease in electrical breakdown characteristics. Therefore, in some devices, a layer having a heat conductivity and a high electric breakdown characteristics need be formed in combination.

As shown in FIG. 3, with use of a high heat conductor for the backing material, it is possible to realize a structure having a high heat conductivity. An equivalent circuit of the mentioned structure is shown in FIG. 19, which illustrates that a heat conductivity 14 of a low heat conductive layer and a heat conductivity 15 of a high heat conductive layer are located series. Since the mica layer serves as a heat barrier, when it is formed into a coil shape, the mica layer does not easily propagate heat.

Figure 18:
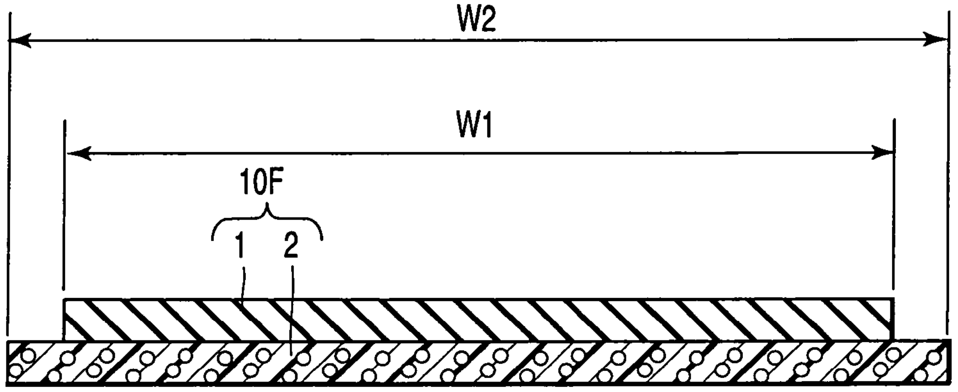
FIG. 18 is a schematic diagram showing a cross section of a highly heat conductive insulating member according to still another embodiment of the present invention.

Therefore, the backing material layer 2 having a high heat conductivity is made wider than the mica layer 1 as shown in FIG. 18, and in this manner, a high heat conductivity can be obtained.

Figure 20:
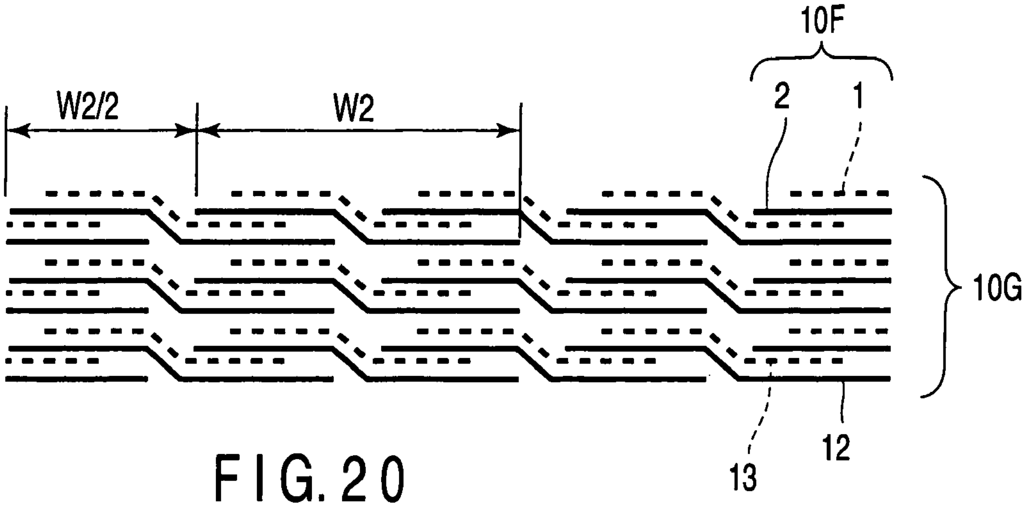
FIG. 20 is a schematic diagram showing a cross section of another highly heat conductive insulating member.

FIG. 20 is a cross sectional view of the main insulating layer in which the high heat conductive layer 12 is made-wider than the low heat conductor layer 13. With this structure, it is considered that high heat conductive layers 12 are connected together via a coil main insulating layer, and therefore a high heat conductivity can be obtained. An equivalent circuit of the mentioned structure is shown in FIG. 21, which illustrates that a heat conductivity 16 of a wide section bypasses a heat conductivity 14 of a low heat conductive mica layer, thereby achieving a high heat conductivity.

Table 2 indicates the difference in heat conductivity index in the case where the heat conductivity of the mica layer was set to 0.22 W/mK, the heat conductivity of the backing material layer was set to 4 W/mK, and the width of the backing material layer was set 10% wider than that of the mica layer. A tape in which the highly heat conductive backing material layer 2 was formed wider was prepared as a sample of Example 2, whereas a tape in which the mica layer 1 and the backing material layer 2 were to have the same width was prepared as a sample of Comparative Example 3. Here, the "heat conductivity index" used here is a relative value having no unit calculated with respect to a reference value of Comparative Example 3 being set to 1.

TABLE 2

| | Comparative Example 3 | Example 2 |
|---|---|---|
| High heat conductive width/low heat conductive width | 1 | 1.1 |
| Heat conductivity index | 1 | 1.25 |

As is clear from TABLE 2, it was observed that the sample of Example 2 exhibited a heat conductivity index higher than that of the sample of Comparative Example 3.

With use of the mica tape of this embodiment, it becomes possible to obtain an electromagnetic coil with a high heat conductivity, easily. Further, an electromagnetic device with a high heat conductivity, can be easily manufactured.

TENTH EMBODIMENT

The tenth embodiment of the present invention will now be described with reference to FIGS. 22 to 25.

In a structure 10H of this embodiment, using two of any mica tapes described in the above embodiments (the figure showing the tape 10 as an example), an electromagnetic coil 2 was prepared. In this coil, the upper and lower surfaces of the tape were inverted, and the tapes were alternately wound in such a manner that the overlapping portion between tape wound sections is displaced by one half of the tape width W (that is, W/2).

In the structure 10H, a tape member prepared by adhering the low heat conductive layer 13 and high heat conductive layer 12 together was wound around a conductor to form the main insulating layer. In this manner, a layer having a low heat conductivity is always interposed between adjacent high heat conductive layers, and therefore the heat propagation is cut off by the layer having a low heat conductivity.

Figure 22:
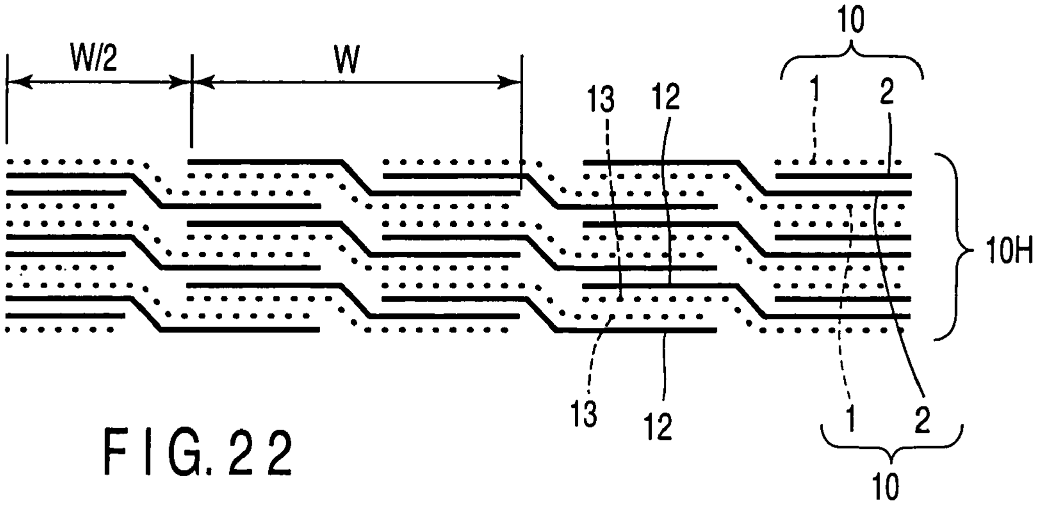
FIG. 22 is a schematic diagram showing a cross section of a highly heat conductive insulating member according to still another embodiment of the present invention.
Figure 23:
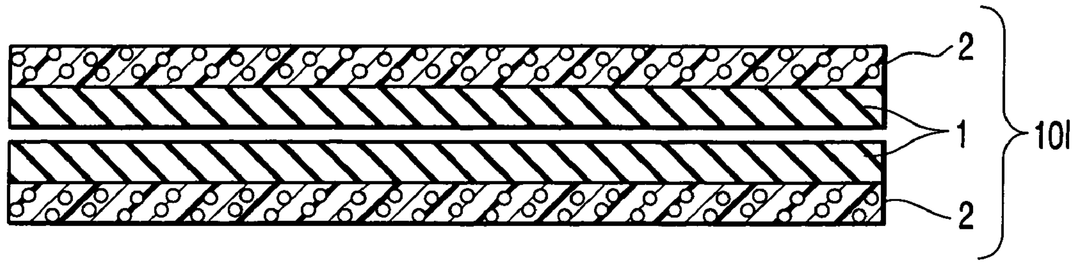
FIG. 23 is a schematic diagram showing a cross section of a highly heat conductive insulating member according to still another embodiment of the present invention.

In order to avoid this, two of tapes prepared by adhering the low heat conductive layer 13 and high heat conductive layer 12 together was used as in a structure 10I shown in FIG. 23. Here, the upper and lower surfaces of each tape were inverted, and the tapes were alternately wound in such a manner that the overlapping portion between tape wound sections is displaced by one half of the tape width W (that is, W/2). Thus, the connection between the highly heat conductive layers shown in FIG. 22 can be established via the main insulating layer, thereby making it possible to obtain a high heat conductivity.

For example, a highly heat conductive material having a heat conductivity of 4 W/mK described in the first embodiment was used as the backing material. Mica was used as the low heat conductive layer and 0.22 W/mK was obtained. They were adhered together and two of thus obtained tapes were wound around a conductor in the same direction to form a main insulating layer, whose cross section was as shown in FIG. 23. As compared to the heat conductivity of the just-mentioned case, two tapes were used, the upper and lower surfaces of each tape were inverted, and the tapes were alternately wound in such a manner that the overlapping portion between tape wound sections is displaced by one half of the tape width W (that is, W/2), to obtain what is shown in FIG. 22. The heat conductivity of this was 1.2 times higher than that of the above-mentioned case.

It is considered that this is because the high heat conductive layers continuously formed heat conductive paths via the main insulating layer.

In the structure 10H, two of any mica tapes described in the above embodiments were used. Here, the upper and lower surfaces of each tape were inverted, and the tapes were alternately wound in such a manner that the overlapping portion between tape wound sections is displaced by one half of the tape width W (that is, W/2). Thus, it becomes possible to obtain an electromagnetic coil with a high heat conductivity, easily. Further, an electromagnetic device with a high heat conductivity, can be easily manufactured.

In this method, the important point is how the heat conducting paths are continuously formed in the main insulating layer.

Figure 24:
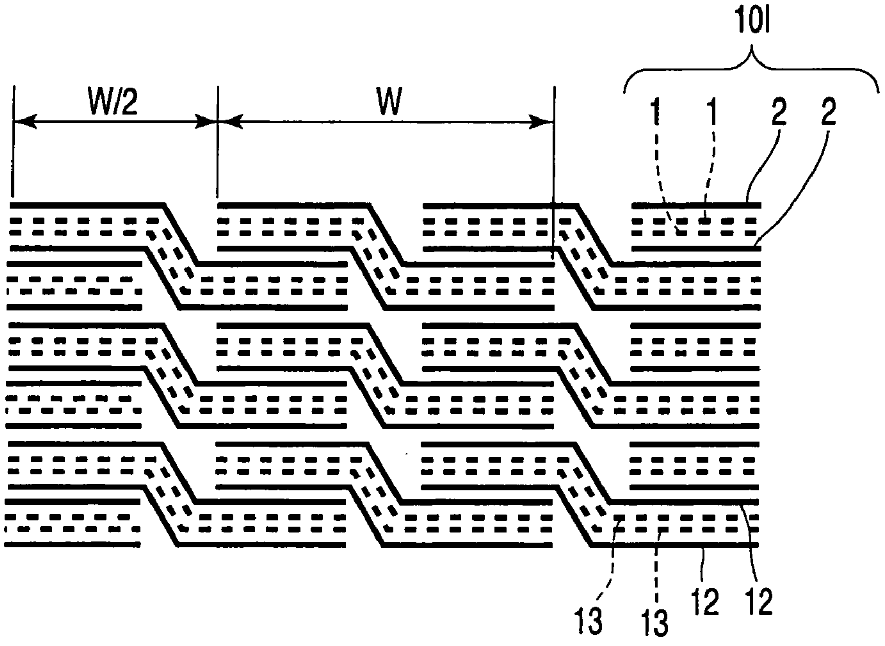
FIG. 24 is a schematic diagram showing a cross section of a highly heat conductive insulating member according to still another embodiment of the present invention.

In the above-described method, two of tapes each prepared by adhering the low heat conductive layer 13 and high heat conductive layer 12 together were used, and the upper and lower surfaces of each tape were inverted, and the tapes were alternately wound in such a manner that the overlapping portion between tape wound sections is displaced by one half of the tape width W (that is, W/2). It is alternatively possible to adhere these two tapes together by the low heat conductive layers facing each other to make one tape, and wind this tape around the conductor. The tape may be wounded to form such a cross section of the main insulating layer as shown in FIG. 24.

It is possible to form a desired main insulating layer, for example, by the following manner. That is, a tape is prepared by filling an epoxy resin with boron nitride and apply the resultant on glass cloth, and the tape is adhered on both sides of a mica layer. Thus obtained tape is wounded to form the main insulating layer.

Further, it is alternatively possible that the highly heat conductive layer 12 is formed separately from the mica tape. More specifically, as shown in FIG. 25, the tape 13 of the above-described embodiment was used as a mica tape, and this tape 13 and the highly heat conductive tape 16 having a heat conductivity of 1 W/mK or higher are alternately wound to formed the main insulating layer.

Figure 25:
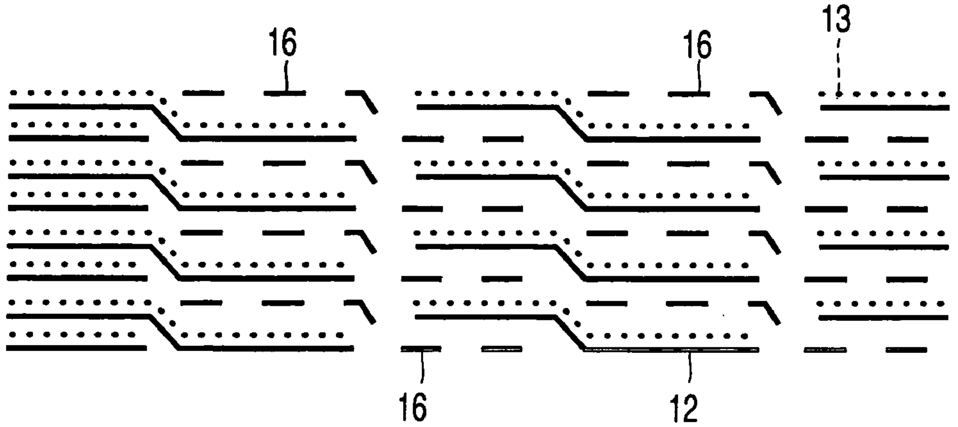
FIG. 25 is a schematic diagram showing a cross section of a highly heat conductive insulating member according to still another embodiment of the present invention.

FIG. 25 illustrates a cross section of the main insulating layer thus obtained. In this case, as the heat conductive tape having a heat conductivity of 1 W/mK or higher, a tape prepared by adding 4% by volume of aluminum oxide to an isopropylene-based elastomer having 60% by volume of boron nitride added thereto, was employed.

Further, a sample that employs the heat conductive sheet and another simple without it were compared with each other in terms of heat conductivity. The result indicated that the former was about 1.25 times higher than the latter.

ELEVENTH EMBODIMENT

The eleventh embodiment of the present invention will now be described with reference to FIG. 26.

In a structure 10L of this embodiment, the mica tapes were alternately wound in such a manner that the overlapping portion between tape wound sections is displaced by less than one half of the tape width W, to obtain the electromagnetic coil described in the above-described embodiment.

Figure 16:
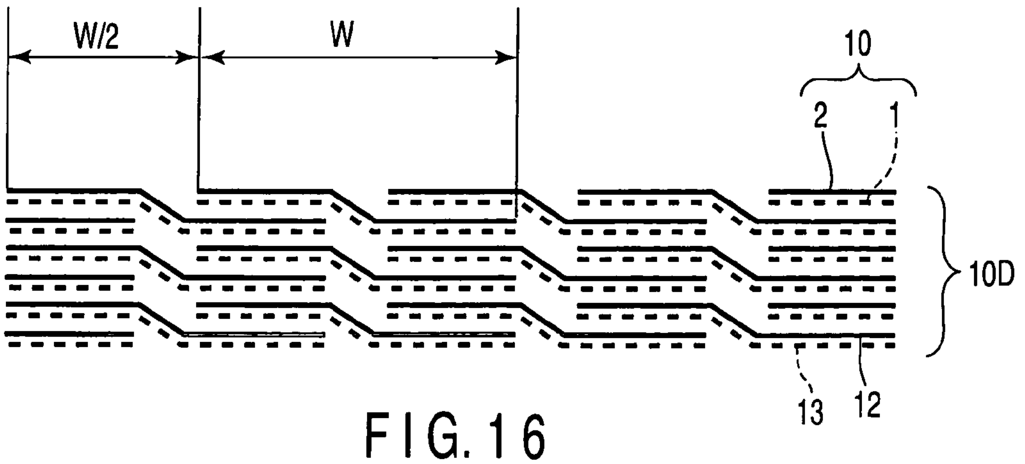
FIG. 16 is a schematic diagram showing a cross section of a highly heat conductive insulating member according to still another embodiment of the present invention.

FIG. 16 illustrates a cross section of the main insulating layer in which the tapes were wound by a displacement of W/2, and the highly heat conductive layer formed a heat conductive path continuously up to the second layer.

Figure 26:
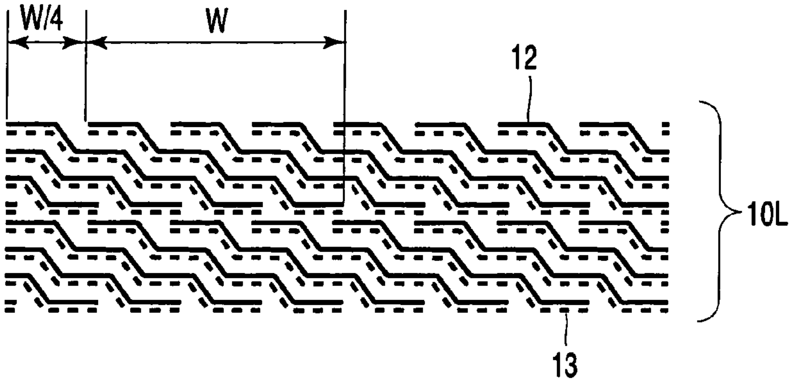
FIG. 26 is a schematic diagram showing a cross section of a highly heat conductive insulating member according to still another embodiment of the present invention.

Meanwhile, FIG. 26 illustrates a cross section of the main insulating layer in which the tapes were wound by a displacement of a quarter of the tape width W (W/4) (that is, 3 W/4 overlapping winding), and the highly heat conductive layer formed a heat conductive path continuously up to the fourth layer. When a long and continuous path is formed in the thickness direction of the main insulating layer, a portion with a low heat conductivity such as impregnated resin is not formed, and therefore an accordingly high heat conductivity can be obtained.

Table 3 indicates a comparison in heat conductivity between a coil sample (Example 3) in which the mica tapes were wound in such a manner that the overlapping portion between tape wound sections was displaced by W/2 (Example 3) and another sample in which they were wound in such a manner that the overlapping portion was displaced by W/4 (Example 4). The heat conductivity index used in this table is a relative value having no unit calculated with respect to a reference value of Comparative Example 3 being set to 1.

TABLE 3

| | Example 3 | Example 4 |
|---|---|---|
| Tape displacement width | W/2 | W/4 |
| Heat conductivity index | 1 | 1.1 |

As is clear from this table, the heat conductivity of Example 4 (displacement width of W/4) was 1.1 times higher than that of Example 3 (W/2). Thus, the cooling power of the electromagnetic coil can be further improved, and the electromagnetic device can be further reduced in size.

It should be noted here that examples of the electromagnetic device are a rotating machine, a power generator and a transformer. An electric motor as the rotating machine is illustrated in U.S. Pat. No. 4,760,296. This document also illustrates a transformer. An electric power generator as the rotating machine is illustrated in U.S. Pat. No. 6,452,294B1.

TWELFTH EMBODIMENT

Figure 27:
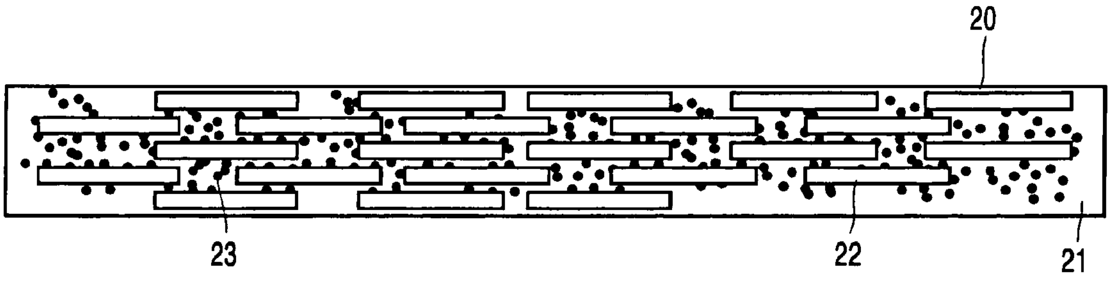
FIG. 27 is a schematic diagram showing a cross section of a highly heat conductive insulating member according to still another embodiment of the present invention.

The twelfth embodiment of the present invention will now be described with reference to FIGS. 27 and 28.

In a material 21 of this embodiment, a composite material containing the first particles 22 and resin 21 was further combined with the second particles 23. The first particles 22 were a material that has a heat conductivity λ of at least 1 W/mK. The second particles 23 were a material of a different type from that of the first particles 22 or having a particle diameter different therefrom.

In this embodiment, boron nitride was used as the first particles 22, carbon black was used as the second particles 23 and an epoxy resin 21 was used as the resin 21.

In order to evaluate the heat conductivity λ of the member 21, two samples manufactured as blow were measured in terms of the heat conductivity λ using a laser flash method. The first sample was made of boron nitride 22 and epoxy resin 1 only without carbon black 23. The boron nitride particles 22, solely by itself, exhibited a heat conductivity value of about 60 W/mK, and had an average particle diameter of 16 μm. This sample was obtained by diffusing 70% by volume of the boron nitride particles 22 into the epoxy resin 21, and then pressing and curing the resultant to have a thickness of 1.5 mm with, for example, a hot press machine. In this embodiment, the hot press had a single pressing operation just one time to have the sample pressed and cured, but it may have a multi-step hot press in which the press is repeated a plurality of times, for example, two to three times.

Figure 28:
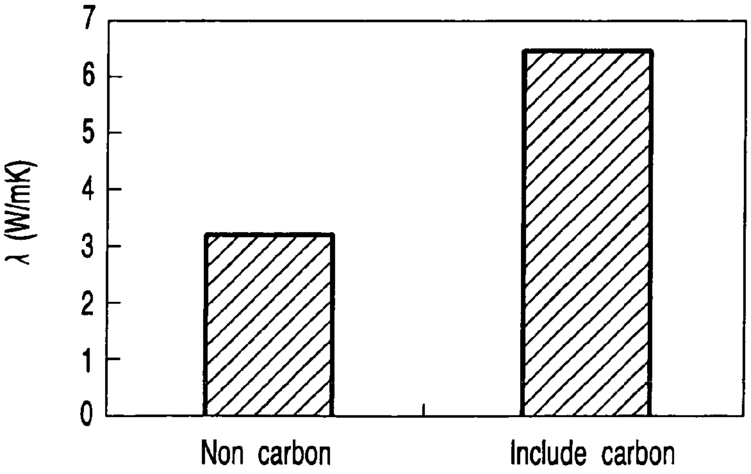
FIG. 28 is a diagram showing a bar graph indicating the effect of the present invention.

Thus obtained first sample, which was obtained without carbon black, was measured in terms of the heat conductivity λ, and the result was 3.22 W/mK as shown in FIG. 28.

By contrast, the second sample was made of carbon black 23, boron nitride 22 and an epoxy resin 21. To 60% by volume of boron nitride particles having an average particle diameter of 16 μm, 5% by volume of carbon black (Asahi Thermal (Tradename) of Asahi Carbon Co., Ltd.) was added and the resultant was stirred for 2 minutes in a stirrer, and the stirred resultant was diffused as a filling material in the epoxy resin 21.

Thus obtained second sample, which was obtained with carbon black, was measured in terms of the heat conductivity λ, and the result was 6.2 W/mK as shown in FIG. 28.

The reason for this is considered as follows. That is, the particles of carbon black 23 entered the epoxy resin portion that was filled with boron nitride 22, to serve as a compliment to connect between boron nitride particles in terms of the heat conductivity.

As is clear from the above-provided descriptions, as compared to the sample containing boron nitride, the heat conductivity was improved by about two times as high by adding a slight amount of the carbon black particles.

Further, in this embodiment, the epoxy resin 22 was used as a surface treating agent such as a binder resin (coupling agent); however the present invention is not limited to this, but it can be used in any resin, for example, a silicone-based resin. Therefore, the invention is not dependent on the composition of the resin and the versatility is high. Consequently, a highly heat conductive material having a high heat conductivity can be provided.

Moreover, the boron nitride particles were used as the first particles 22 in this embodiment. In place of this, it is alternatively possible to use a ceramic material having a heat conductivity of 1 W/mK or higher and containing any one of aluminum nitride, aluminum oxide, magnesium oxide, silicon nitride, chromium oxide, aluminum hydroxide, artificial diamond, diamond-like carbon, carbon-like diamond, silicon carbide, laminar silicate clay mineral and mica.

Further, the carbon black particles were used as the second particles 23 in this embodiment. However, the present invention is not limited to this, but it is alternatively possible to use boron nitride particles having difference particles diameters with an average particle diameter of, for example, 3 μm. Furthermore, it is alternatively possible to use one or more types selected from the group consisting of aluminum nitride, aluminum oxide, magnesium oxide, silicon nitride, chromium oxide, aluminum hydroxide, artificial diamond, diamond-like carbon, carbon-like diamond, silicon carbide, gold, cupper, iron, laminar silicate clay mineral and mica.

THIRTEENTH EMBODIMENT

The thirteenth embodiment of the present invention will now be described with reference to FIG. 27.

In the material of this embodiment, the second particles had a heat conductivity of at least 0.5 W/mK or higher. The reason whey the heat conductivity λ was greatly improved with the material 21 of this embodiment is assumed to be that the interstices that were created while being filled with the first particles 22 could be filled with the second particles 23. According to this reasoning, it is preferable that the second particles 23 should be of a type having a heat conductivity λ higher than that of the resin 21.

For example, the heat conductivity λ of aluminum nitride (AlN) is 100 W/mK. Therefore, when aluminum nitride particles are added as the second particles 23 to the composite material made of boron nitride and resin, the heat conductivity λ of the material 21 is further improved.

FOURTEENTH EMBODIMENT

The fourteenth embodiment of the present invention will now be described with reference to FIGS. 27 and 29.

In the material of this embodiment, boron nitride was used as the first particles and an epoxy resin was used as the binder resin 21. Further, carbon black (Asahi Thermal (Tradename) of Asahi Carbon Co., Ltd.) was used as the second particles 23 and the content of the carbon black particles was set to be 0.5% by volume or higher.

With the above-described structure, it is clear that the heat conductivity λ was further improved. FIG. 29 is a diagram showing a characteristic curve indicating the results of examination of the heat conductivity λ of the member of this embodiment, with the horizontal axis indicating the volume ratio (vol %) of carbon black with respect to the volume excluding boron nitride and the vertical axis indicating the heat conductivity λ (W/mK). In this figure, the characteristic curve E indicates the change in the heat conductivity λ.

Figure 29:
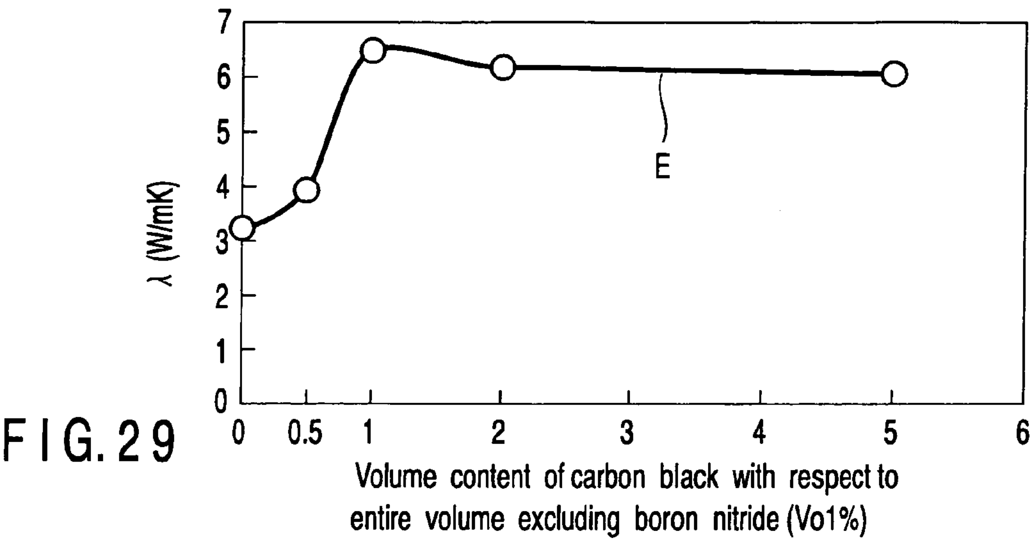
FIG. 29 is a diagram showing a characteristic curve indicating the effect of carbon black with respect to the heat conductivity of the insulating tape containing boron nitride.

As is clear from FIG. 29, in a region where 1% by volume or more, a prominent increase in heat conductivity such as two times or more was observed as compared to the sample that does not contain carbon black particles. It should be pointed out that the increase in the heat conductivity λ is not dependent on the type of binder resin, but it was achieved by filling the boron nitride particles and carbon black particles in a composite manner.

FIFTEENTH EMBODIMENT

The fifteenth embodiment of the present invention will now be described with reference to FIGS. 30 and 31.

In the material 20A of this embodiment, the content of the carbon black particles 24 was set to be 33.3% by volume or lower with respect to the total amount of the resin 21 and carbon black particles 24.

In the above-described material 20A, the carbon black particles 24 have a high electrical conductivity. Consequently, the use of the material as an electrical insulating member is not preferable because an increase in the electric conductivity σ cause an adverse effect on the performance of the product.

Figure 30:
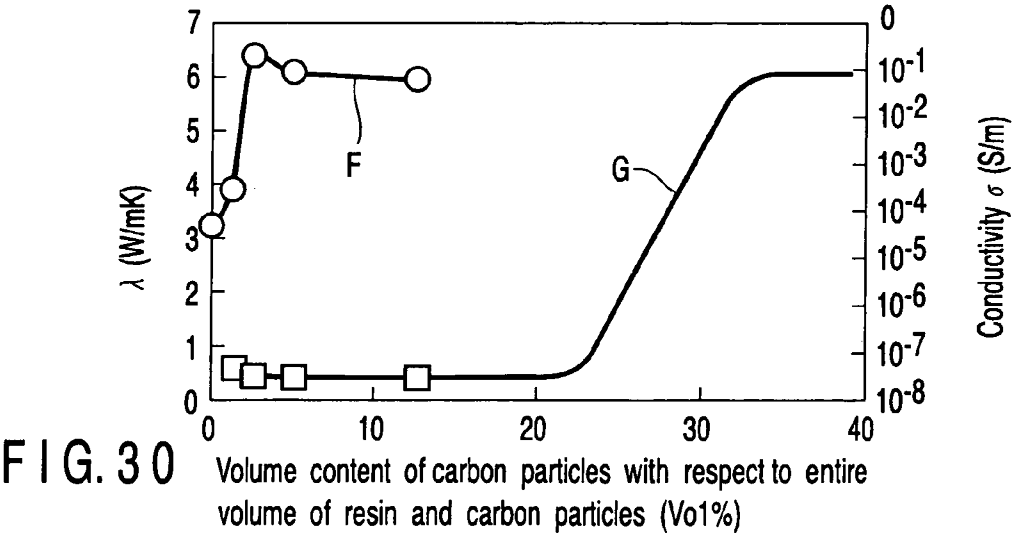
FIG. 30 is a diagram showing a characteristic curve indicating the results of the examination on the effect of the contents of the carbon particles on each of the heat conductivity λ and electro-conductivity σ.
Figure 31:
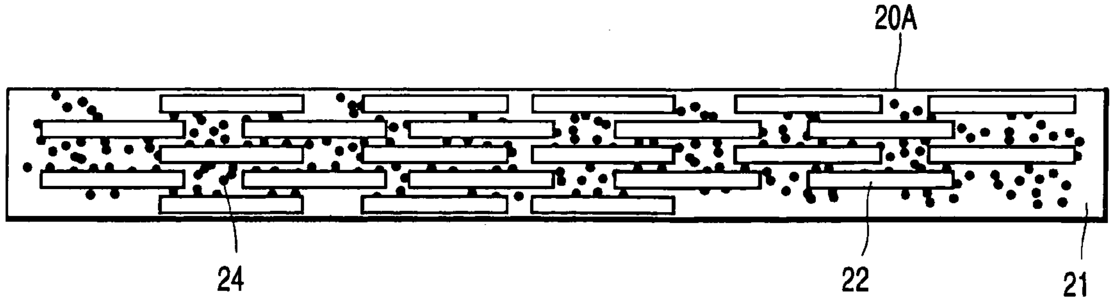
FIG. 31 is a schematic diagram showing a cross section of a highly heat conductive insulating member according to still another embodiment of the present invention.

FIG. 30 is a diagram showing a characteristic curve indicating the results of examination of the comparison between the volume content of carbon particles and heat conductivity λ or electric conductivity σ, with the horizontal axis indicating the volume content (vol %) of the carbon black particles with respect to the total amount of the resin and carbon particles in volume, the left-hand side vertical axis indicating the heat conductivity λ (W/mK) and the right-hand side vertical axis indicating the electric conductivity σ (S/m). In this figure, the characteristic curve F indicates the change in the heat conductivity λ, and the characteristic curve G indicates the change in the electric conductivity σ. It should be noted that the unit of electric conductivity σ is siemens ($S=\Omega-1$) per length (m).

As is clear from this figure, in a region where the carbon black particles are added in an amount of 33.3% by volume or more, the electric resistance becomes low and stable. The reason for this is considered as follows. That is, carbon particles form infinite clusters in the sample. In other words, a so-called percolation phenomenon occurs. The occurring of this phenomenon has been confirmed in the researches carried out so far by the inventors of the present invention.

The formation of infinite clusters means that carbon black particles are connected together in the sample and they serve to connect the interior of the sample without interposing the resin layer as shown in 31, which creates an extremely undesirable state for insulation. This phenomenon is determined by the physical diffusion state regardless of the type of binder resin.

In this embodiment, the sample was prepared such that the content of the carbon black particles 24 was adjusted to be 33.3% by volume or lower with respect to the total amount of the resin 21 and carbon black particles 24. With this structure, a highly heat conductive material having a high versatility, being not dependent on the composition of the epoxy resin 21, a high heat conductivity and an insulating property was obtained.

SIXTEENTH EMBODIMENT

The sixteenth embodiment of the present invention will now be described with reference to FIG. 31.

In the material of this embodiment, aluminum nitride particles (having a particle diameter of less than 1 μm to nanometer) that served as the second particles 24 were made smaller in size than boron nitride particles (having a particle diameter of 1 μm to 100 μm) that served as the first particles 22.

It should be noted that aluminum nitride has a molecular amount of 41.0 at a purity of 3N.

In this embodiment, ALI04PB (product model number) of Japan Pure Chemical Co., Ltd. was used as aluminum nitride. It is alternatively possible to use a commercial product of Tachyon Co., LTd. as aluminum nitride.

In this case, it is considered that the aluminum nitride particles 24 serves to fill the interstices created in the epoxy resin 21 by the boron nitride particles 22, thereby making it possible to exhibit a high heat conductivity λ. Here, if the aluminum particles 24 are larger in particle size than the boron nitride particles 22, the heat conductive paths created of the boron nitride particles 22 and contributing to the heat conductivity λ are shut off, which causes the lowering of the heat conductivity λ.

In order to avoid this, the particle diameter of the aluminum nitride particles was set smaller than that of the boron nitride particles.

With this structure, a highly heat conductive material having a high versatility, being not dependent on the composition of the binder resin, a high heat conductivity and an insulating property was obtained.

SEVENTEENTH EMBODIMENT

Figure 32:
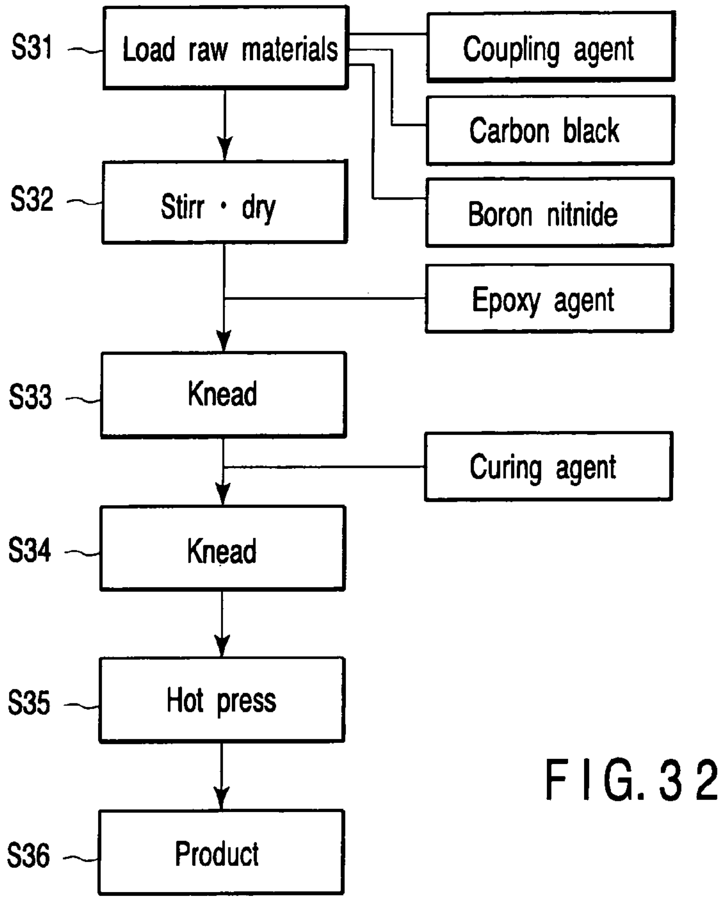
FIG. 32 is a diagram illustrating a flowchart of a manufacturing method according to still another embodiment of the present invention.

The seventeenth embodiment of the present invention will now be described with reference to the flowchart shown in FIG. 32.

In a raw material loading step S31, boron nitride particles 22 and carbon black particles 23 are loaded in a molding machine (not shown) and at the same time, a coupling agent (binder resin), which will be later explained, is loaded.

In a stirring and drying step S32, the raw material loading step S31 is stirred and dried.

In a kneading step S33, a two-liquid mixture type epoxy main agent is injected into the raw material while it is in a stirred and dried state, and the raw material and the others are kneaded.

In a kneading step S34, an epoxy sub-agent is mixed to the epoxy main agent in a kneaded state obtained in the kneading step S33 and the resultant is further kneaded.

In a hot press curing step S35, the resultant is then cured by hot press. Lastly, in a product obtaining S36, the product obtained in the hot press curing step S35 is unloaded.

A specific example will now be described. For example, carbon black of Asahi Thermal (Tradename) of Asahi Carbon Co., Ltd. was added at an appropriate volume ratio to boron nitride particles having an average particle diameter of 16 μm, and the mixture was stirred with a stirrer for two minutes. Then, 3 g of 1% solution obtained by dissolving a silane coupling agent, A189 (of Nippon Unicar Co., Ltd.) into ethanol was loaded in three steps, and the resultant was continuously stirred. After that, the resultant was air-dried for 24 hours, and subjected to a coupling process, thus obtaining a filling material. Thus obtained filling material was diffused in an epoxy resin such that the volume ratio of a total of boron nitride and carbon black is 65% by volume of the entire amount. Then, the resultant was subjected to a hot press to press and cure it, thereby preparing a plate member.

The heat conductivity λ of thus obtained plate member was measured and it was 8.6 W/mK. As compared to a conventional case where a coupling agent was not used, the result indicated that the heat conductivity λ was improved by about 0.5 W/mK. The reason for this is considered that the bonding force between filling materials became strong via the resin, which promoted the transmission of phonons. Thus, when the coupling agent is loaded at the same time as the timing of loading the raw materials, a highly heat conductive material having a high heat conductivity was obtained.

It should be noted that as the coupling agent, not only the silane coupling agent, but also a zircon-based or titanium-based agent is clearly as effective as that. In this embodiment, it is one way to carry out the coupling treatment with an epoxy resin; however it is alternatively possible for a sufficient effect that the surface of the filling material is modified with a carboxylic group or hydroxyl group and they are made to react with each other to directly increase the bonding force.

EIGHTEENTH EMBODIMENT

Figure 33:
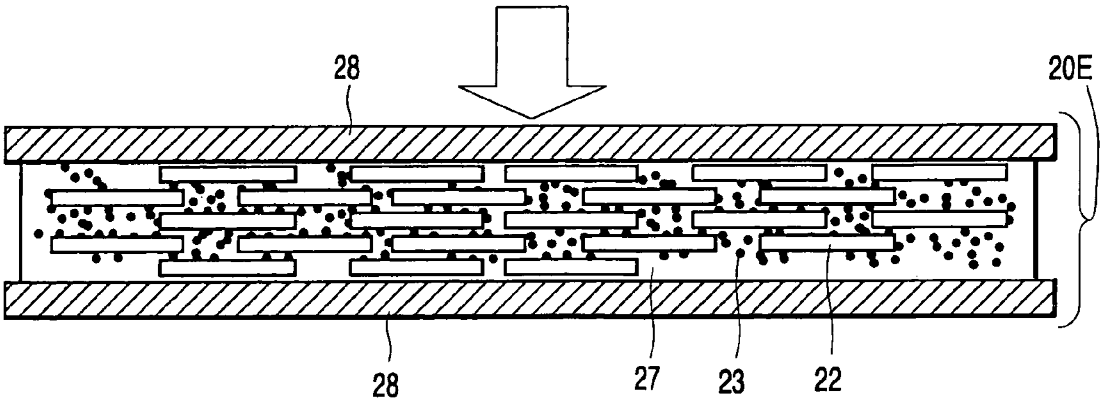
FIG. 33 is a schematic diagram showing a cross section of a highly heat conductive insulating member according to still another embodiment of the present invention.

The eighteenth embodiment of the present invention will now be described with reference to the flowchart shown in FIG. 33.

In this embodiment, the material of the above-described embodiment was employed and formed into a tape-like or film-like shape. The material of this embodiment exhibits a high heat conductivity by a physically dispersed state of the filling material, and has an extremely high versatility.

For example, polyethylene pellets 27, boron nitride particles 22 and carbon black particles 23 are mixed and kneaded, and the kneaded mixture was placed between two press plates 28. Then, using a hot press machine (not shown), the kneaded mixture was heated and pressed to form a tape or film having a high heat conductivity.

Here, the material used for the film is not limited to polyethylene, but any one of various types of thermoplastic resins, thermosetting resins and elastomers may be used.

When an isoprene-based elastomer, for example, is used as the elastomer, the elasticity becomes higher as compared to the case of a thermoplastic resin or thermosetting resin, and therefore a film product or the like thus obtained with a high plasticity can be obtained.

In this case, it is possible to use, as the first particles, one or more types of particles selected from the group consisting of boron nitride, aluminum nitride, aluminum oxide, magnesium oxide, silicon nitride, chromium oxide, aluminum hydroxide, artificial diamond, diamond-like carbon, carbon-like diamond, silicon carbide, laminar silicate clay mineral and mica. Further, it is possible to use, as the second particles, one or more types of particles selected from the group consisting of boron nitride, carbon, aluminum nitride, aluminum oxide, magnesium oxide, silicon nitride, chromium oxide, aluminum hydroxide, artificial diamond, diamond-like carbon, carbon-like diamond, silicon carbide, gold, cupper, iron, laminar silicate clay mineral and mica.

NINETEENTH EMBODIMENT

The nineteenth embodiment of the present invention will now be described. A wire-wounded conductor 5, which is used for a cast resin transformer, is covered by an insulating member of any one of the above-described embodiments. The structure of the cast resin transformer is discussed in, for example, U.S. Pat. No. 4,760,296.

In the cast resin transformer, the injection molded resin obtained by mixing 40% by volume of boron nitride and 1% by volume of carbon black to an epoxy-based thermosetting resin, followed by kneading, was employed. As a result, the heat conductivity λ of the insulating layer 6 could be increased by about 1.5 times. Thus, the cooling efficiency of the electromagnetic coil was improved and the density of the current flowing through the coil could be increased by about 20%. Further, the measurements of the coil could be reduced. As a result, it became possible to manufacture a small-sized cast resin transformer.

According to the present invention, there can be provided a highly heat conductive insulating member that has a high heat conductivity λ and an excellent heat radiating property. Further, according to the invention, there can be provided a method of manufacturing a highly versatile and highly heat conductive insulating member easily. Further, a small-sized electromagnetic coil having an excellent heat radiating property as well as an electromagnetic device can be provided.

What is claimed is:

1. A highly heat conductive member used for insulating an electromagnetic device, and the member formed into a tape-like or sheet-like shape, comprising:

a mica tape;

a backing material layer adhered to the mica tape;

a resin matrix included in the backing material layer;

first particles having a heat conductivity of 1 W/mK or higher and 300 W/mK or lower, and diffused in the backing material layer; and second particles having a diameter which is 0.15 or less times smaller than that of the first particles and having a heat conductivity of 0.5 W/mK or higher and 300 W/mK or lower, the second particles diffused in the backing material layer, and contained in the backing material layer in an amount of 0.5% by volume or more.

2. The insulating member according to claim 1, wherein the first particles are made of one or more types selected from the group consisting of boron nitride, aluminum nitride, aluminum oxide, magnesium oxide, silicon nitride, chromium oxide, aluminum hydroxide, artificial diamond, diamond-like carbon, carbon-like diamond, silicon carbide, laminar silicate clay mineral and mica.

3. The insulating member according to claim 1, wherein the second particles are made of either one of carbon and aluminum oxide.

4. The insulating member according to claim 1, wherein the content of the second particles is 33.3% by volume or less with respect to a total amount of the second particles and the resin.

5. The insulating member according to claim 1, wherein the backing material layer is provided on both surfaces of the mica layer.

6. The insulating member according to claim 1, wherein the mica layer comprises: mica paper made of mica scales; and second particles having a heat conductivity of 0.5 W/mK or higher and 300 W/mK or lower, that are diffused in the mica paper.

7. The insulating member according to claim 1, wherein the backing material layer is formed wider than the mica layer.

* * * * *